United States Patent
Boyd et al.

(10) Patent No.: US 12,227,096 B2
(45) Date of Patent: Feb. 18, 2025

(54) MICROMOBILITY TRANSIT VEHICLE BATTERY CHARGING SYSTEMS AND METHODS

(71) Applicant: Lyft, Inc., San Francisco, CA (US)

(72) Inventors: Jeffrey Alan Boyd, San Rafael, CA (US); Marc Daniel Fenigstein, San Francisco, CA (US); Conrad Xavier Murphy, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 848 days.

(21) Appl. No.: 16/917,201

(22) Filed: Jun. 30, 2020

(65) Prior Publication Data

US 2021/0402885 A1    Dec. 30, 2021

(51) Int. Cl.
| | |
|---|---|
| *B60L 53/30* | (2019.01) |
| *B60L 53/302* | (2019.01) |
| *B60L 53/31* | (2019.01) |
| *B60L 53/80* | (2019.01) |
| *H02J 7/00* | (2006.01) |

(52) U.S. Cl.
CPC ............. *B60L 53/30* (2019.02); *B60L 53/302* (2019.02); *B60L 53/305* (2019.02); *B60L 53/31* (2019.02); *B60L 53/80* (2019.02); *H02J 7/0044* (2013.01)

(58) Field of Classification Search
CPC ...... B60L 53/31; B60L 53/301; B60L 53/305; H02J 7/0044; H02J 7/00032; H02J 7/0013; H02J 7/0042; H02J 7/0047; H02J 7/02; Y02T 10/70; Y02T 10/7072; Y02T 90/12; Y02T 90/16
See application file for complete search history.

(56) References Cited

U.S. PATENT DOCUMENTS

| | | | |
|---|---|---|---|
| 7,130,190 B1* | 10/2006 | Baker | H02J 7/0031 |
| | | | 280/47.35 |
| 9,104,373 B1* | 8/2015 | Lechman | G06F 1/1632 |
| 2012/0263989 A1* | 10/2012 | Byun | H01M 50/271 |
| | | | 361/752 |
| 2012/0303397 A1* | 11/2012 | Prosser | B60L 53/18 |
| | | | 705/7.12 |
| 2016/0068075 A1* | 3/2016 | Chen | B60L 53/65 |
| | | | 320/107 |
| 2019/0363590 A1* | 11/2019 | Jakubowski | H02J 50/005 |
| 2020/0338992 A1* | 10/2020 | Tian | B60L 50/64 |
| 2021/0001744 A1* | 1/2021 | Suzuki | B60L 50/50 |
| 2021/0061124 A1* | 3/2021 | Kim | B60L 53/80 |
| 2021/0399267 A1* | 12/2021 | Wolf | H01M 50/20 |

* cited by examiner

*Primary Examiner* — Richard Isla
*Assistant Examiner* — Johali A Torres Ruiz
(74) *Attorney, Agent, or Firm* — Baker Botts L.L.P.

(57) ABSTRACT

A battery charging cabinet for micromobility transit vehicle batteries may include a cabinet housing, at least one drawer, a plurality of charging docks, and a plurality of battery chargers. The drawer may be configured to extend from and retract into the cabinet housing. The plurality of charging docks may be disposed in the drawer where each of the plurality of charging docks may be configured to interface with a battery for a micromobility transit vehicle. The plurality of battery chargers may be disposed in a corresponding charging dock of the drawer, where the battery charger is able to charge the battery held in the corresponding charging dock. Related systems and methods are additionally disclosed.

20 Claims, 27 Drawing Sheets

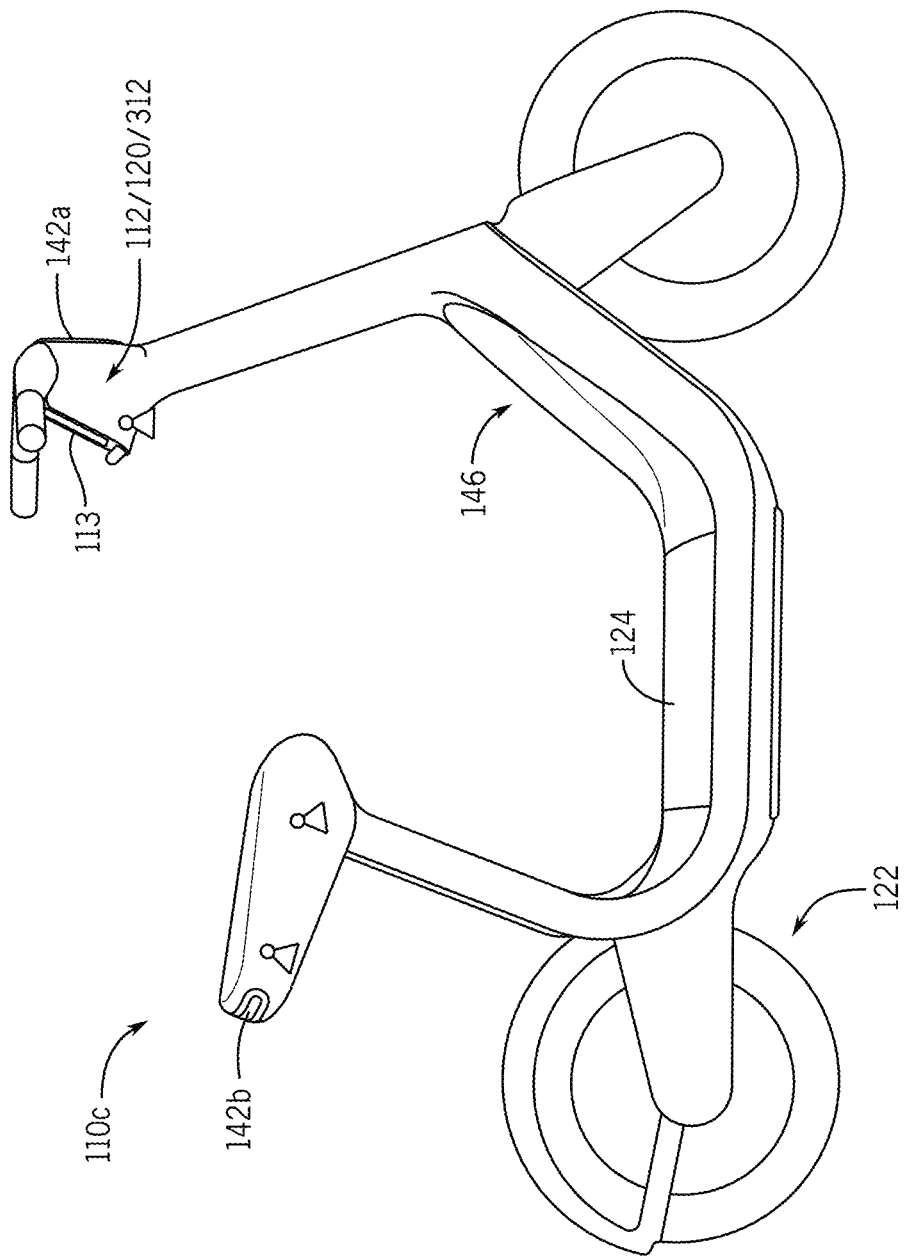

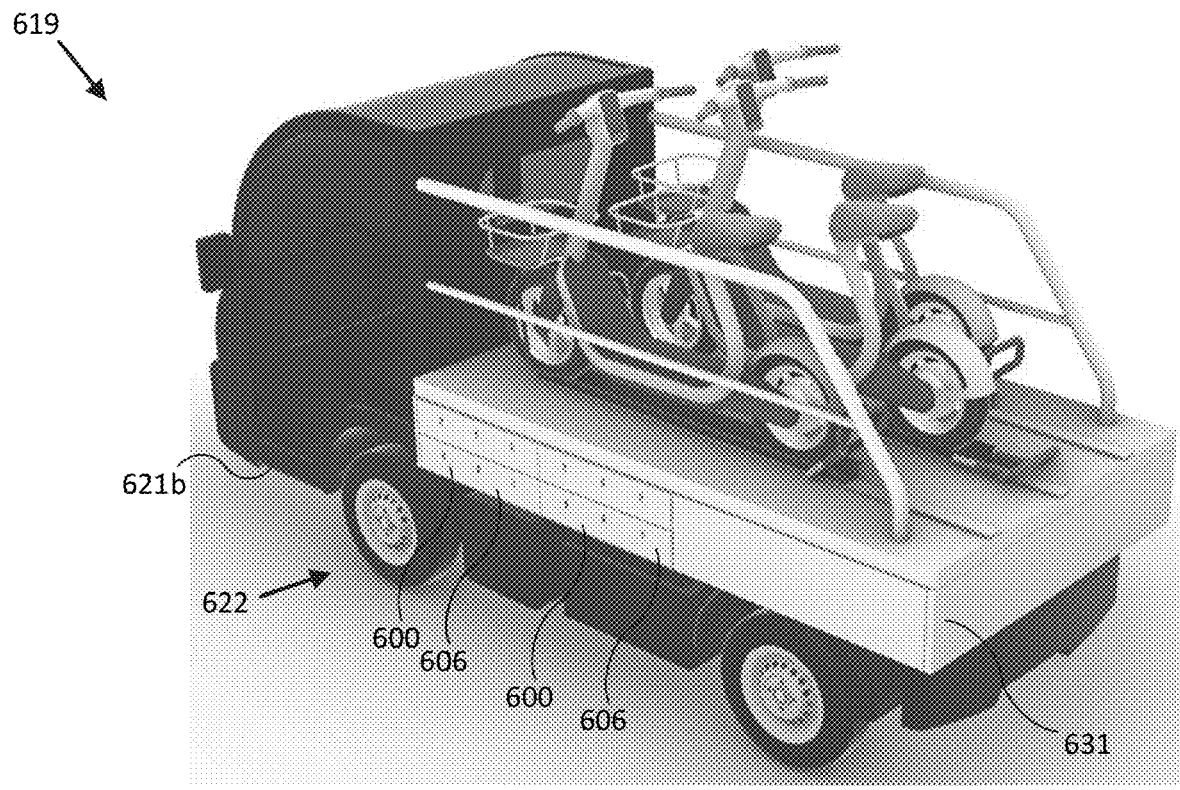
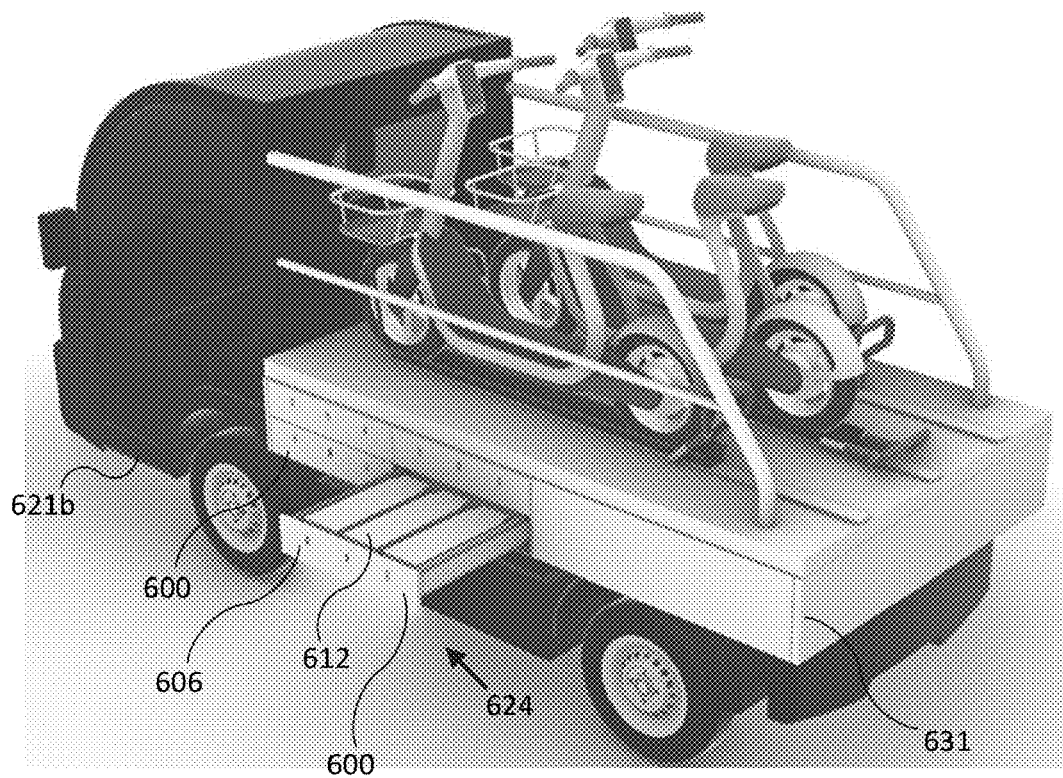
FIG. 6G

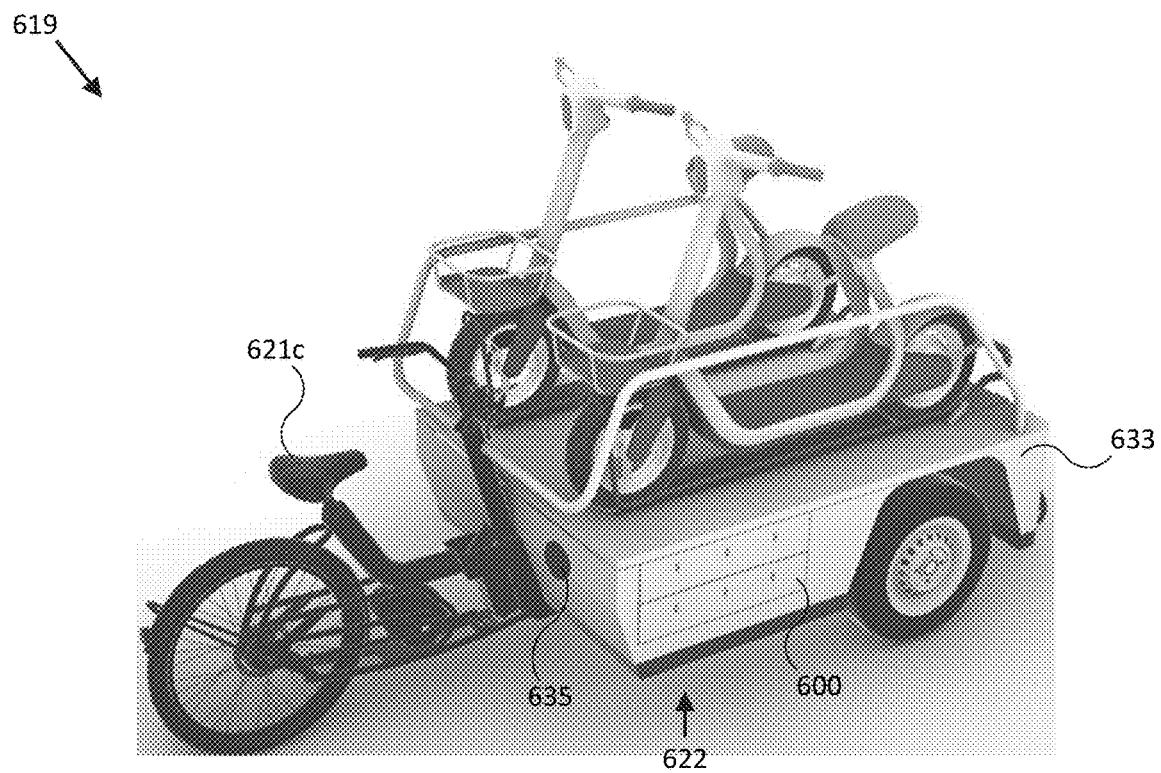
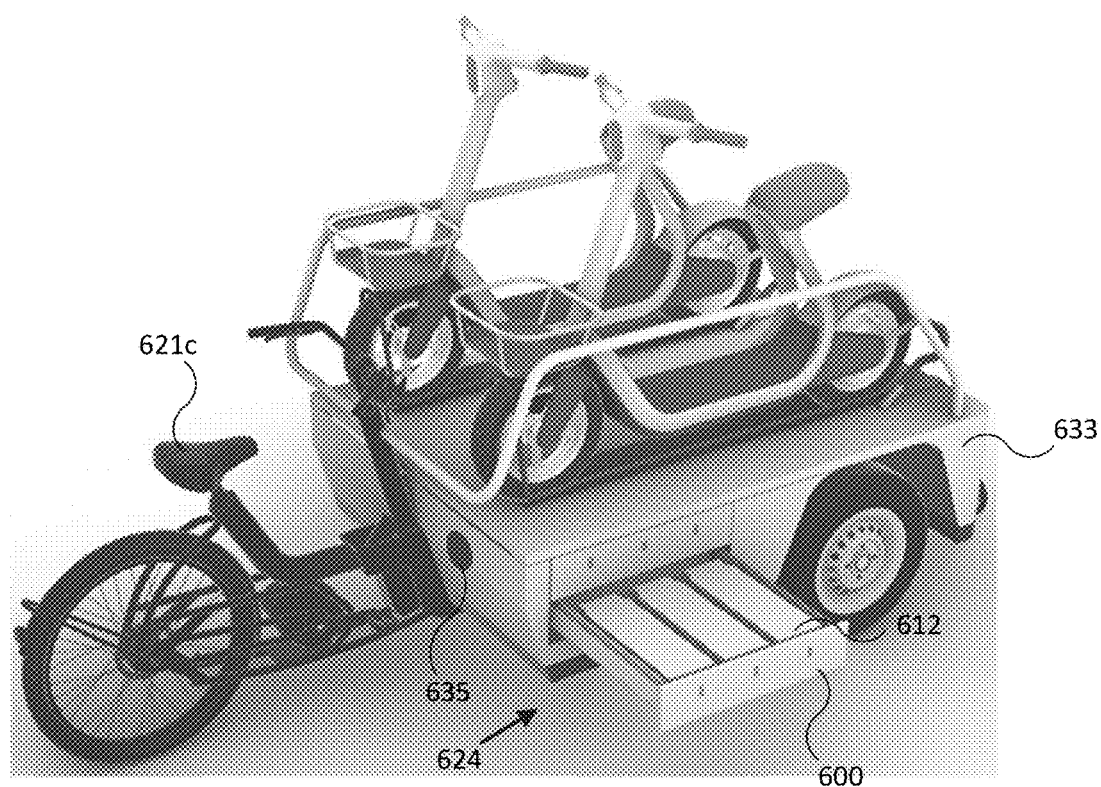
FIG. 6H

MICROMOBILITY TRANSIT VEHICLE BATTERY CHARGING SYSTEMS AND METHODS

TECHNICAL FIELD

One or more embodiments of the present disclosure relate generally to micromobility transit vehicles and more particularly, for example, to systems and methods for charging batteries for micromobility transit vehicles.

BACKGROUND

Contemporary transportation services may incorporate a variety of different types of vehicles, including motorized or electric scooters and bicycles designed to transport one or two people at once (collectively, micromobility transit vehicles). Such micromobility transit vehicles provide an additional dimension of transportation flexibility, particularly when such vehicles are incorporated into a dynamic transportation matching system that links requestors or users to transit vehicles for use. Servicing an extensive fleet of micromobility transit vehicles can present significant and cumbersome capital investment and labor (e.g., time and cost) burden to a fleet manager/servicer. For example, recharging and swapping out batteries for micromobility transit vehicles may require transporting the micromobility transit vehicle to a charging location or rendering the micromobility transit vehicle unavailable for use until its battery can be replaced, both of which are inconvenient and costly for a servicer. Therefore, there is a need in the art for systems and methods directed to battery charging for micromobility transit vehicles where batteries can conveniently be charged and easily swapped to minimize downtime and labor burden.

SUMMARY

Techniques are disclosed for systems and methods directed to a battery charging cabinet for micromobility transit vehicle batteries. In accordance with one or more embodiments, the battery charging cabinet may include a cabinet housing, one or more drawers, a plurality of charging docks, and a plurality of battery chargers. The one or more drawers may be configured to extend from and retract into the cabinet housing. One or more of the plurality of charging docks may be disposed in the one or more drawers such that each of the charging docks can interface with a battery of a micromobility transit vehicle. The plurality of battery chargers may be disposed in corresponding charging docks in the drawers. The battery chargers may charge the battery held in the corresponding charging dock.

In accordance with one or more embodiments, a battery charging station may include one or more battery charging cabinets. A battery charging station may be a stationary battery charging station or a mobile/remote battery charging station. For example, a stationary battery charging station may have one or more battery charging cabinets placed in a warehouse (or other building) such as on tabletops, shelves, storage racks, walls, the ground surface, and so forth. In an example in which the battery charging station is mobile or remote (e.g., remote from the service warehouse or building), the one or more battery charging cabinets may be installed in a vehicle (e.g., a service technician vehicle) to allow for mobile charging of batteries as various micromobility transit vehicles move from location to location and/or swapping out their batteries with charged batteries.

In accordance with one or more embodiments, a method for assembling a battery charging cabinet may include installing a plurality of battery chargers in a plurality of drawers of the battery charging cabinet. Each of the plurality of battery chargers may be installed into a corresponding charging dock within the drawers, where each of the plurality of battery chargers is able to charge a battery held in the corresponding charging dock. The charging docks may be able to interface with several different types of batteries corresponding to different micromobility transit vehicles. The method further includes installing the plurality of drawers in the cabinet housing of the battery charging cabinet such that each drawer can extend from and retract into a housing of the charging cabinet.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments of the invention. Reference will be made to the appended sheets of drawings that will first be described briefly.

BRIEF DESCRIPTION OF THE DRAWINGS

FIGS. 3A, 3B, and 3C illustrate respective diagrams of micromobility transit vehicles for use in a dynamic transportation matching system in accordance with an embodiment of the disclosure.

FIGS. 6F-6H illustrate various examples of mobile battery charging stations in accordance with various embodiments of the present disclosure.

FIG. 6O illustrates a diagram of a battery charging cabinet having air flow channels to facilitate cooling internal components in accordance with one or more embodiments of the disclosure.

Embodiments of the invention and their advantages are best understood by referring to the detailed description that follows. It should be appreciated that like reference numerals are used to identify like elements illustrated in one or more of the figures.

DETAILED DESCRIPTION

Figure 1:
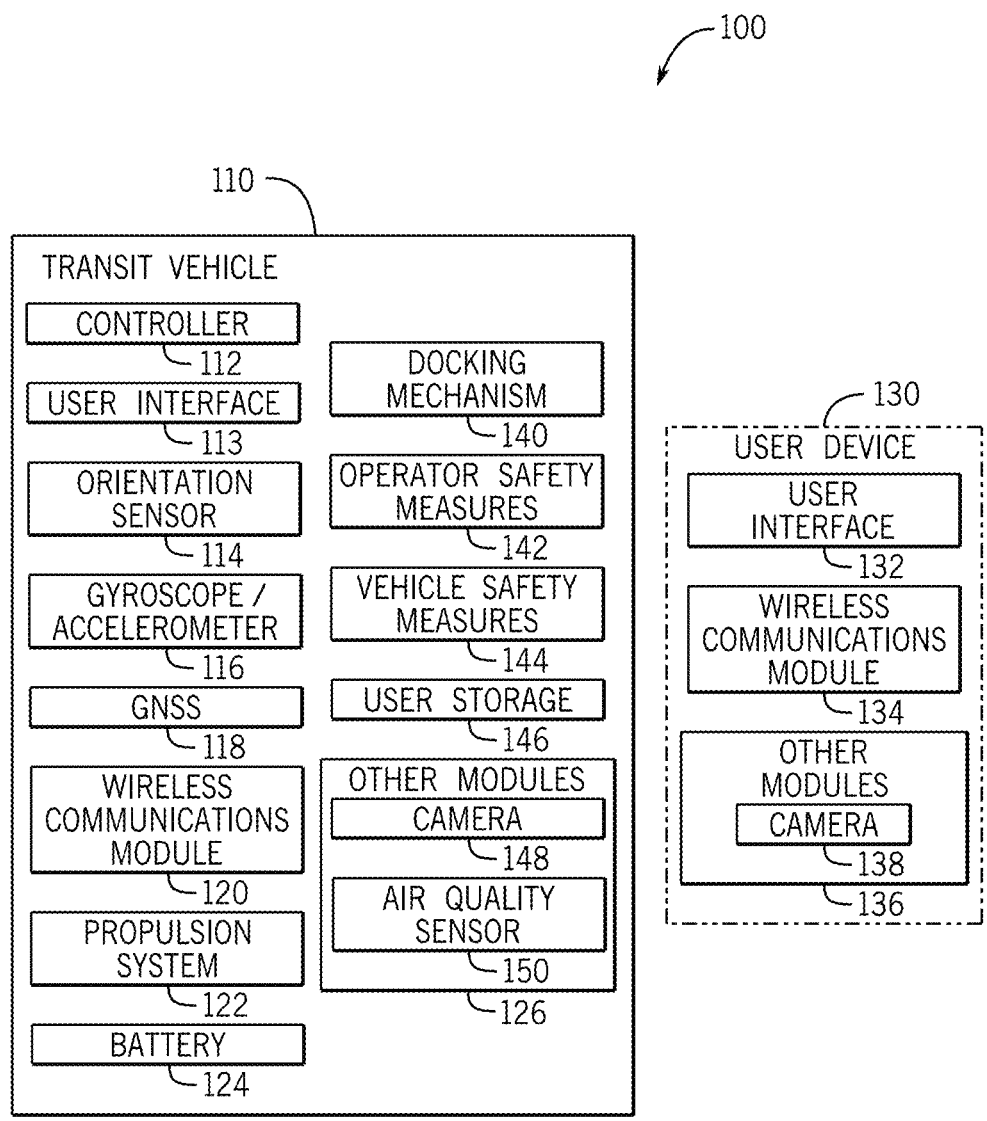
FIG. 1 illustrates a block diagram of a portion of a dynamic transportation matching system including a transit vehicle in accordance with an embodiment of the disclosure.

Techniques are disclosed for systems and methods directed to a battery charging cabinet for micromobility transit vehicle batteries. In accordance with one or more embodiments, the battery charging cabinet may include a cabinet housing, one or more drawers, a plurality of charging docks, and a plurality of battery chargers. The one or more drawers may be configured to extend from and retract into the cabinet housing. One or more of the plurality of charging docks may be disposed in the one or more drawers such that each of the charging docks can interface with a battery of a micromobility transit vehicle placed therein for charging. The plurality of battery chargers may be disposed in corresponding charging docks within the drawers and able to charge the battery held in the corresponding charging dock.

In some embodiments, the cabinet housing of the battery charging cabinet may have at least one opening defined in a wall of the housing to allow for dissipation of heat from the battery chargers inside the battery charging cabinet as well as any other component inside the cabinet housing. As the batteries are charging in the charging cabinet, light indicators (e.g., light sources, LED lights, etc.) on a face of the drawers of the battery charging cabinet may illuminate in certain patterns, intensities, and/or colors to allow a user to quickly glance at the drawers and know the charging status of the batteries inside the drawers according to various embodiments. In one implementation, the battery charging cabinets may include an electromechanical lock capable of receiving an RFID tag/card/key to lock and unlock the drawers of the battery charging cabinet.

In one or more embodiments, a battery charging station may include one or more battery charging cabinets. A battery charging station may be a stationary battery charging station or a mobile/remote battery charging station. For example, a stationary battery charging station may have one or more battery charging cabinets placed in a warehouse (or other building) such as on tabletops, shelves, storage racks, walls, the ground surface, and so forth. In an example in which the battery charging station is mobile or remote (e.g., remote from a service warehouse or building), the one or more battery charging cabinets may be installed in a vehicle (e.g., a service technician vehicle) to allow for mobile charging of batteries as various micromobility transit vehicles move from location to location out in the field and/or swapping out batteries with charged batteries.

According to some embodiments, a method for assembling a battery charging cabinet may include installing a plurality of battery chargers in a plurality of drawers of the battery charging cabinet. Each of the plurality of battery chargers may be installed into a corresponding charging dock within the drawers, where each of the plurality of battery chargers is able to charge a battery held in the corresponding charging dock. The charging docks may be able to interface with several different types of batteries corresponding to different micromobility transit vehicles, such as those discussed below. The method further includes installing the plurality of drawers in the cabinet housing of the battery charging cabinet such that each drawer can extend from and retract into the cabinet housing. Additional aspects of battery charging cabinets as well as systems and methods directed to battery charging for micromobility transit vehicles will further be discussed below in reference to the appended figures.

FIG. 1 illustrates a block diagram of a portion of a dynamic transportation matching system 100 (e.g., system 100) including a transit vehicle 110 in accordance with an embodiment of the disclosure. In the embodiment shown in FIG. 1, system 100 includes transit vehicle 110 and optionally a user device 130. In general, transit vehicle 110 may be a passenger vehicle designed to transport a single person (e.g., a micromobility transit vehicle, a transit bike and scooter vehicle, or the like) or a group of people (e.g., a typical car or truck). More specifically, transit vehicle 110 may be implemented as a motorized or electric kick scooter, bicycle, and/or motor scooter designed to transport one or perhaps two people at once typically on a paved road (collectively, micromobility transit vehicles), as a typical automobile configured to transport up to 4, 7, or 10 people at once, or according to a variety of different transportation modalities (e.g., transportation mechanisms). Transit vehicles similar to transit vehicle 110 may be owned, managed, and/or serviced primarily by a fleet manager/servicer providing transit vehicle 110 for use by the public as one or more types of transportation modalities offered by a dynamic transportation matching system, for example. In some embodiments, transit vehicles similar to transit vehicle 110 may be owned, managed, and/or serviced by a private owner using the dynamic transportation matching system to match their vehicle to a transportation request, such as with ridesharing or ridesourcing applications typically executed on a mobile user device, such as user device 130 as described herein. User device 130 may be a smartphone, tablet, near field communication (NFC) or radio-frequency identification (RFID) enabled smart card, or other personal or portable computing and/or communication device that may be used to facilitate rental and/or operation of transit vehicle 110.

As shown in FIG. 1, transit vehicle 110 may include one or more of a controller 112, a user interface 113, an orientation sensor 114, a gyroscope/accelerometer 116, a global navigation satellite system (GNSS) receiver 118, a wireless communications module 120, a camera 148, a propulsion system 122, an air quality sensor 150, and other modules 126. Operation of transit vehicle 110 may be substantially manual, autonomous, and/or partially or completely controlled by user device 130, which may include one or more of a user interface 132, a wireless communications module 134, a camera 138, and other modules 136. In other embodiments, transit vehicle 110 may include any one or more of the elements of user device 130. In some embodiments, one or more of the elements of system 100 may be implemented in a combined housing or structure that can be coupled to or within transit vehicle 110 and/or held or carried by a user of system 100.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of transit vehicle 110 and/or other elements of system 100, for example. Such software instructions may also implement methods for processing images such as those provided by camera 148, and/or other sensor signals or data, determining sensor information, providing user feedback (e.g., through user interface 113 or 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user via user interface 113 or 132. In some embodiments, controller 112 may be integrated with one or more other elements of transit vehicle 110, for example, or distributed as multiple logic devices within transit vehicle 110 and/or user device 130.

In some embodiments, controller 112 may be configured to substantially continuously monitor and/or store the status of and/or sensor data provided by one or more elements of transit vehicle 110 and/or user device 130, such as the position and/or orientation of transit vehicle 110 and/or user device 130, for example, and the status of a communication link established between transit vehicle 110 and/or user device 130. Such communication links may be established and then provide for transmission of data between elements of system 100 substantially continuously throughout operation of system 100, where such data includes various types of sensor data, control parameters, and/or other data.

User interface 113 of transit vehicle 110 may be implemented as one or more of a display, a touch screen, a keyboard, a mouse, a joystick, a knob, a steering wheel, a yoke, and/or any other device capable of accepting user input and/or providing feedback to a user. In various embodiments, user interface 113 may be adapted to provide user input (e.g., as a type of signal and/or sensor information transmitted by wireless communications module 134 of user device 130) to other devices of system 100, such as controller 112. User interface 113 may also be implemented with one or more logic devices (e.g., similar to controller 112) that may be adapted to store and/or execute instructions, such as software instructions, implementing any of the various processes and/or methods described herein. For example, user interface 113 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 113 may be adapted to display a time series of various sensor information and/or other parameters as part of or overlaid on a graph or map, which may be referenced to a position and/or orientation of transit vehicle 110 and/or other elements of system 100. For example, user interface 113 may be adapted to display a time series of positions, headings, and/or orientations of transit vehicle 110 and/or other elements of system 100 overlaid on a geographical map, which may include one or more graphs indicating a corresponding time series of actuator control signals, sensor information, and/or other sensor and/or control signals. In some embodiments, user interface 113 may be adapted to accept user input including a user-defined target heading, waypoint, route, and/or orientation, for example, and to generate control signals to cause transit vehicle 110 to move according to the target heading, route, and/or orientation. In other embodiments, user interface 113 may be adapted to accept user input modifying a control loop parameter of controller 112, for example.

Orientation sensor 114 may be implemented as one or more of a compass, float, accelerometer, and/or other device capable of measuring an orientation of transit vehicle 110 (e.g., magnitude and direction of roll, pitch, and/or yaw, relative to one or more reference orientations such as gravity and/or Magnetic North), camera 148, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of transit vehicle 110 and/or other elements of system 100 and providing such measurements as sensor signals and/or data that may be communicated to other devices of system 100 (e.g., user interface 132, controller 112).

GNSS receiver 118 may be implemented according to any global navigation satellite system, including a GPS, GLONASS, and/or Galileo based receiver and/or other device capable of determining absolute and/or relative position of transit vehicle 110 (e.g., or an element of transit vehicle 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS receiver 118 may include an altimeter, for example, or may be used to provide an absolute altitude.

Wireless communications module 120 may be implemented as any wireless communications module configured to transmit and receive analog and/or digital signals between elements of system 100. For example, wireless communications module 120 may be configured to directly or indirectly receive control signals and/or data from user device 130 and provide them to controller 112 and/or propulsion system 122. In other embodiments, wireless communications module 120 may be configured to receive images and/or other sensor information (e.g., still images or video images) and relay the sensor data to controller 112 and/or user device 130. In some embodiments, wireless communications module 120 may be configured to support spread spectrum transmissions, for example, and/or multiple simultaneous communications channels between elements of system 100. Wireless communication links formed by wireless communications module 120 may include one or more analog and/or digital radio communication links, such as WiFi, Bluetooth, NFC, RFID, LTE, and others, as described herein, and may be direct communication links established between elements of system 100, for example, or may be relayed through one or more wireless relay stations configured to receive and retransmit wireless communications. In various embodiments, wireless communications module 120 may be configured to support wireless mesh networking, as described herein.

In some embodiments, wireless communications module 120 may be configured to be physically coupled to transit vehicle 110 and to monitor the status of a communication link directly or indirectly established between transit vehicle 110 and/or user device 130. Such status information may be provided to controller 112, for example, or transmitted to other elements of system 100 for monitoring, storage, or further processing, as described herein. In addition, wireless communications module 120 may be configured to determine a range to another device, such as based on time of flight, and provide such range to the other device and/or controller 112. Communication links established by communication module 120 may be configured to transmit data between elements of system 100 substantially continuously throughout operation of system 100, where such data includes various types of sensor data, control parameters, and/or other data, as described herein.

Propulsion system 122 may be implemented as one or more motor-based propulsion systems, and/or other types of propulsion systems that can be used to provide motive force to transit vehicle 110 and/or to steer transit vehicle 110. In some embodiments, propulsion system 122 may include elements that can be controlled (e.g., by controller 112 and/or user interface 113) to provide motion for transit vehicle 110 and to provide an orientation for transit vehicle 110. In various embodiments, propulsion system 122 may be implemented with a portable power supply, such as a battery. In some embodiments, propulsion system 122 may be implemented with a combustion engine/generator and fuel supply.

For example, in some embodiments, such as when propulsion system 122 is implemented by an electric motor (e.g., as with many micromobility transit vehicles), transit vehicle 110 may include battery 124. Battery 124 may be implemented by one or more battery cells (e.g., lithium ion battery cells) and be configured to provide electrical power to propulsion system 122 to propel transit vehicle 110, for example, as well as to various other elements of system 100, including controller 112, user interface 113, and/or wireless communications module 120. In some embodiments, battery 124 may be implemented with its own safety measures, such as thermal interlocks and a fire-resistant enclosure, for example, and may include one or more logic devices, sensors, and/or a display to monitor and provide visual feedback of a charge status of battery 124 (e.g., a charge percentage, a low charge indicator, etc.).

Other modules 126 may include other and/or additional sensors, actuators, communications modules/nodes, and/or user interface devices, for example, and may be used to provide additional environmental information related to operation of transit vehicle 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), and/or other environmental sensors providing measurements and/or other sensor signals that can be displayed to a user and/or used by other devices of system 100 (e.g., controller 112) to provide operational control of transit vehicle 110 and/or system 100. In further embodiments, other modules 126 may include a light, such as a headlight or indicator light, and/or an audible alarm, both of which may be activated to alert passersby to possible theft, abandonment, and/or other critical statuses of transit vehicle 110. In particular, and as shown in FIG. 1, other modules 126 may include camera 148 and/or air quality sensor 150.

Camera 148 may be implemented as an imaging device including an imaging module including an array of detector elements that can be arranged in a focal plane array. In various embodiments, camera 148 may include one or more logic devices (e.g., similar to controller 112) that can be configured to process imagery captured by detector elements of camera 148 before providing the imagery to communications module 120 or other elements of the system 100. More generally, camera 148 may be configured to perform any of the operations or methods described herein, at least in part, or in combination with controller 112 and/or user interface 113 or 132. In some embodiments, camera 148 may be a visible light imager and/or thermal imager.

In various embodiments, air quality sensor 150 may be implemented as an air sampling sensor configured to determine an air quality of an environment about transit vehicle 110 and provide corresponding air quality sensor data. Air quality sensor data provided by air quality sensor 150 may include particulate count, methane content, ozone content, and/or other air quality sensor data associated with common street level sensitivities and/or health monitoring typical when in a street level environment, such as that experienced when riding on a typical micromobility transit vehicle, as described herein.

Transit vehicles implemented as micromobility transit vehicles may include a variety of additional features designed to facilitate fleet management and user and environmental safety. For example, as shown in FIG. 1, transit vehicle 110 may include one or more of docking mechanism 140, operator safety measures 142, vehicle security device 144, and/or user storage 146, as described in more detail herein by reference to FIGS. 3A-C.

User interface 132 of user device 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by wireless communications module 134 of user device 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of transit vehicle 110 and/or other elements of system 100. For example, user interface 132 may be adapted to display a time series of positions, headings, and/or orientations of transit vehicle 110 and/or other elements of system 100 overlaid on a geographical map, which may include one or more graphs indicating a corresponding time series of actuator control signals, sensor information, and/or other sensor and/or control signals. In some embodiments, user interface 132 may be adapted to accept user input including a user-defined target heading, waypoint, route, and/or orientation, for example, and to generate control signals to cause transit vehicle 110 to move according to the target heading, route, and/or orientation. In other embodiments, user interface 132 may be adapted to accept user input modifying a control loop parameter of controller 112, for example.

Wireless communications module 134 may be implemented as any wireless communications module configured to transmit and receive analog and/or digital signals between elements of system 100. For example, wireless communications module 134 may be configured to directly or indirectly transmit control signals from user interface 132 to wireless communications module 120 or 134. In some embodiments, wireless communications module 134 may be configured to support spread spectrum transmissions, for example, and/or multiple simultaneous communications channels between elements of system 100. In various embodiments, wireless communications module 134 may be configured to monitor the status of a communication link established between user device 130 and/or transit vehicle 110 (e.g., including packet loss of transmitted and received data between elements of system 100, such as with digital communication links), and/or determine a range to another device, as described herein. Such status information may be provided to user interface 132, for example, or transmitted to other elements of system 100 for monitoring, storage, or further processing, as described herein. In various embodiments, wireless communications module 134 may be configured to support wireless mesh networking, as described herein.

Other modules 136 of user device 130 may include other and/or additional sensors, actuators, communications modules/nodes, and/or user interface devices used to provide additional environmental information associated with user device 130, for example. In some embodiments, other modules 136 may include a humidity sensor, a wind and/or water temperature sensor, a barometer, a radar system, a visible spectrum camera, an infrared camera, a GNSS receiver, and/or other environmental sensors providing measurements and/or other sensor signals that can be displayed to a user and/or used by other devices of system 100 (e.g., controller 112) to provide operational control of transit vehicle 110 and/or system 100 or to process sensor data to compensate for environmental conditions. As shown in FIG. 1, other modules 136 may include camera 138.

Camera 138 may be implemented as an imaging device including an imaging module including an array of detector elements that can be arranged in a focal plane array. In various embodiments, camera 138 may include one or more logic devices (e.g., similar to controller 112) that can be configured to process imagery captured by detector elements of camera 138 before providing the imagery to communications module 120. More generally, camera 138 may be configured to perform any of the operations or methods described herein, at least in part, or in combination with controller 138 and/or user interface 113 or 132.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 and/or elements of other systems similar to system 100 using a variety of wired and/or wireless communication techniques, including voltage signaling, Ethernet, WiFi, Bluetooth, Zigbee, Xbee, Micronet, Near-field Communication (NFC) or other medium and/or short range wired and/or wireless networking protocols and/or implementations, for example. In such embodiments, each element of system 100 may include one or more modules supporting wired, wireless, and/or a combination of wired and wireless communication techniques, including wireless mesh networking techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for transit vehicle 110, using one or more power leads. Such power leads may also be used to support one or more communication techniques between elements of system 100.

Figure 2:
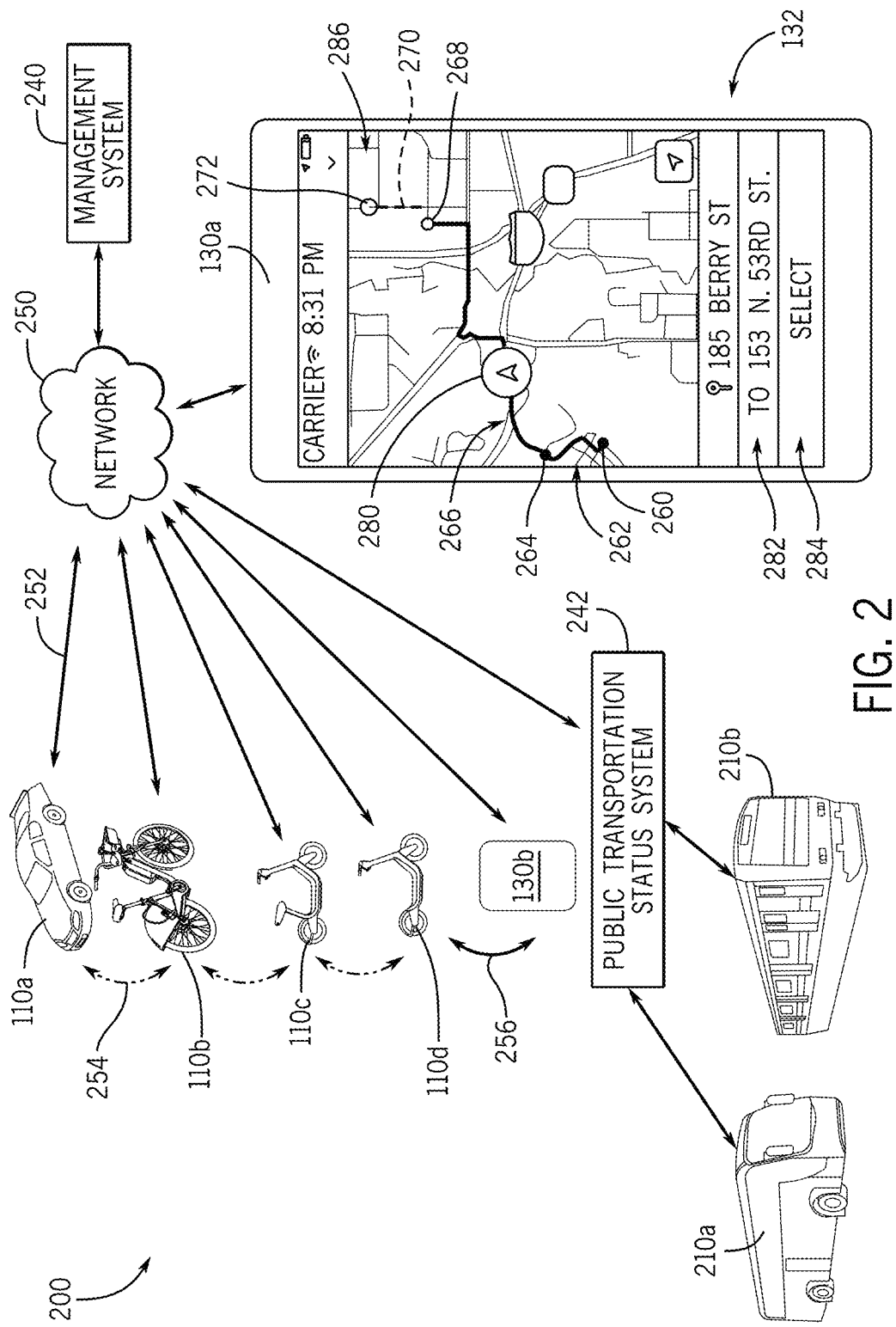
FIG. 2 illustrates a block diagram of a dynamic transportation matching system incorporating a variety of transportation modalities in accordance with an embodiment of the disclosure.

FIG. 2 illustrates a block diagram of a dynamic transportation matching system 200 (or multimodal transportation system) incorporating a variety of transportation modalities in accordance with an embodiment of the disclosure. For example, as shown in FIG. 2, dynamic transportation matching system 200 may include multiple embodiments of system 100. In the embodiment shown in FIG. 2, dynamic transportation matching system 200 includes a management system/server 240 in communication with a number of transit vehicles 110a-d and user devices 130a-b over a combination of a typical wide area network (WAN) 250, WAN communication links 252 (solid lines), a variety of mesh network communication links 254 (curved dashed lines), and NFC, RFID, and/or other local communication links 256 (curved solid lines). Dynamic transportation matching system 200 also includes a public transportation status system 242 in communication with a variety of public transportation vehicles, including one or more buses 210a, trains 210b, and/or other public transportation modalities, such as ships, ferries, light rail, subways, streetcars, trolleys, cable cars, monorails, tramways, and aircraft. As shown in FIG. 2, all transit vehicles are able to communicate directly to WAN 250 and, in some embodiments, may be able to communicate across mesh network communication links 254, to convey fleet data and/or fleet status data amongst themselves and/or to and from management system 240.

In FIG. 2, user device 130a may receive an input with a request for transportation with one or more transit vehicles 110a-d and/or public transportation vehicles 210a-b. For example, the transportation request may be a request to use (e.g., hire or rent) one of transit vehicles 110a-d. The transportation request may be transmitted to management system 240 over WAN 250, allowing management system 240 to poll status of transit vehicles 110a-d and to select one of transit vehicles 110a-d to fulfill the transportation request. Upon or after one of the transit vehicles 110a-d is selected to fulfill the transportation request, a fulfillment notice from management system 240 and/or from the selected transit vehicle 110a-d may be transmitted to the user device 130a. In some embodiments, navigation instructions to proceed to or otherwise meet with the selected transit vehicle 110a-d may be sent to the user device 130a. A similar process may occur using user device 130b, but where the transportation request enables a transit vehicle over a local communication link 256, as shown.

Management system 240 may be implemented as a server with controllers, user interfaces, communications modules, and/or other elements similar to those described with respect to system 100 of FIG. 1, but with sufficient processing and storage resources to manage operation of dynamic transportation matching system 200, including monitoring statuses of transit vehicles 110a-d, as described herein. In some embodiments, management system 240 may be implemented in a distributed fashion and include multiple separate server embodiments linked communicatively to each other direction and/or through WAN 250. WAN 250 may include one or more of the Internet, a cellular network, and/or other wired or wireless WANs. WAN communication links 252 may be wired or wireless WAN communication links, and mesh network communication links 254 may be wireless communication links between and among transit vehicles 110a-d, as described herein.

User device 130a in FIG. 2 includes a display of user interface 132 that shows a planned route for a user attempting to travel from an origination point 260 to a destination 272 using different transportation modalities (e.g., a planned multimodal route), as depicted in a route/street map 286 rendered by user interface 132. For example, management system 240 may be configured to monitor statuses of all available transportation modalities (e.g., including transit vehicles and public transportation vehicles) and provide a planned multimodal route from origination point 260 to destination 272. Such a planned multimodal route may include, for example, a walking route 262 from origination point 260 to a bus stop 264, a bus route 266 from bus stop 264 to a bus stop 268 (e.g., using one or more of transit vehicles 210a or 210b), and a micromobility route 270 (e.g., using one or more of micromobility transit vehicles 110b, 110c, or 110d) from bus stop 268 to destination 272. Also shown rendered by user interface 132 are a present location indicator 280 (indicating a present absolute position of user device 130a on street map 286), a navigation destination selector/indicator 282 (e.g., configured to allow a user to input a desired navigation destination), and a notice window 284 (e.g., used to render vehicle status data or other information, including user notices and/or alerts, as described herein). For example, a user may use navigation destination selector/indicator 282 to provide and/or change destination 272, as well as change any portion (e.g., leg, route, etc.) or modality of the multimodal route from origination point 260 to destination 272. In some embodiments, notice window 284 may display instructions for traveling to a next waypoint along the determined multimodal route (e.g., directions to walk to a bus stop, directions to ride a micromobility transit vehicle to a next stop along the route, etc.).

In various embodiments, management system 240 may be configured to provide or suggest an optimal multimodal route to a user (e.g., initially and/or while traversing a particular planned route), and a user may select or make changes to such a route through manipulation of user device 130a, as shown. For example, management system 240 may be configured to suggest a quickest route, a least expensive route, a most convenient route (to minimize modality changes or physical actions a user must take along the route), an inclement weather route (e.g., that keeps the user protected from inclement weather a maximum amount of time during route traversal), or some combination of those that is determined as best suited to the user, such as based on various user preferences. Such preferences may be based on prior use of system 200, prior user trips, a desired arrival time and/or departure time (e.g., based on user input or obtained through a user calendar or other data source), or specifically input or set by a user for the specific route, for example, or in general. In one example, origination point 260 may be extremely congested or otherwise hard to access by a ride-share transit vehicle, which could prevent or significantly increase a wait time for the user and a total trip time to arrive at destination 272. In such circumstances, a planned multimodal route may include directing the user to walk and/or take a scooter/bike to an intermediate and less congested location to meet a reserved ride-share vehicle, which would allow the user to arrive at destination 272 quicker than if the ride-share vehicle was forced to meet the user at origination point 260. It will be appreciated that numerous different transportation-relevant conditions may exist or dynamically appear or disappear along a planned route that may make it beneficial to use different modes of transportation to arrive at destination 272 efficiently, including changes in traffic congestion and/or other transportation-relevant conditions that occur mid-route, such as an accident along the planned route. Under such circumstances, management system 240 may be configured to adjust a modality or portion of the planned route dynamically in order to avoid or otherwise compensate for the changed conditions while the route is being traversed.

Figure 3A:
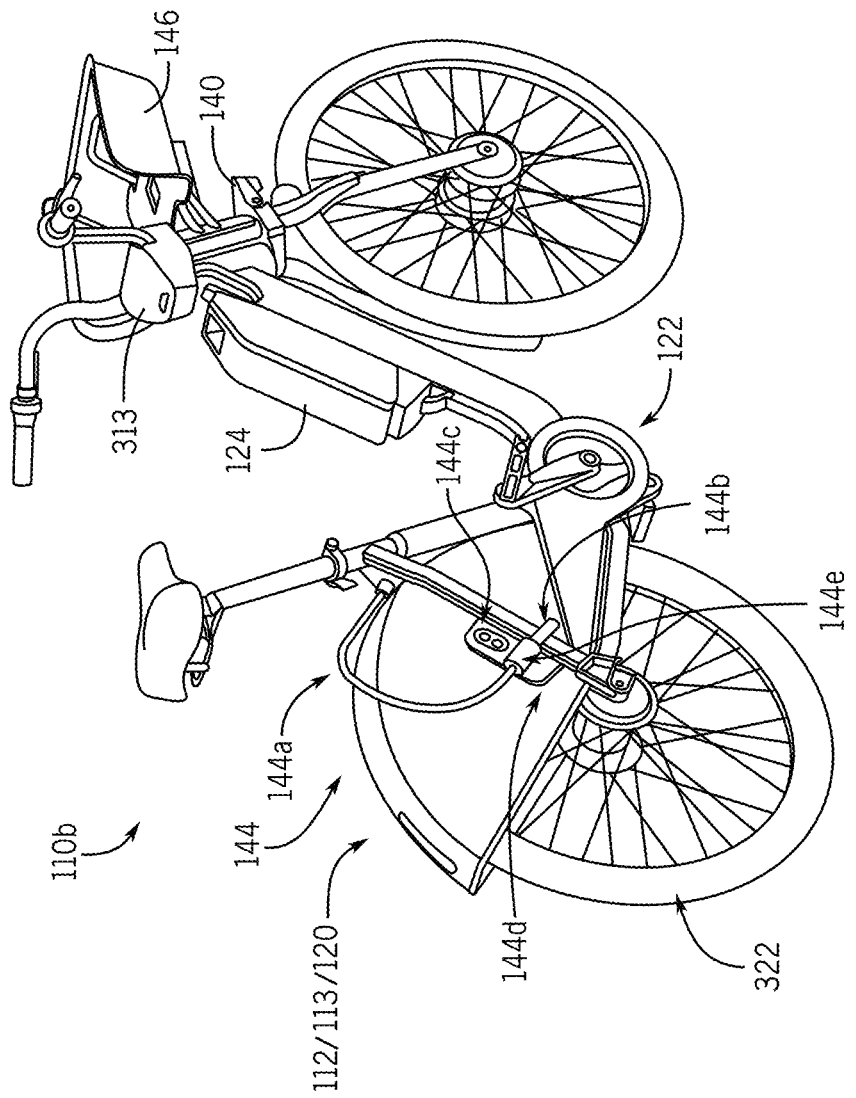
Figure 3C:
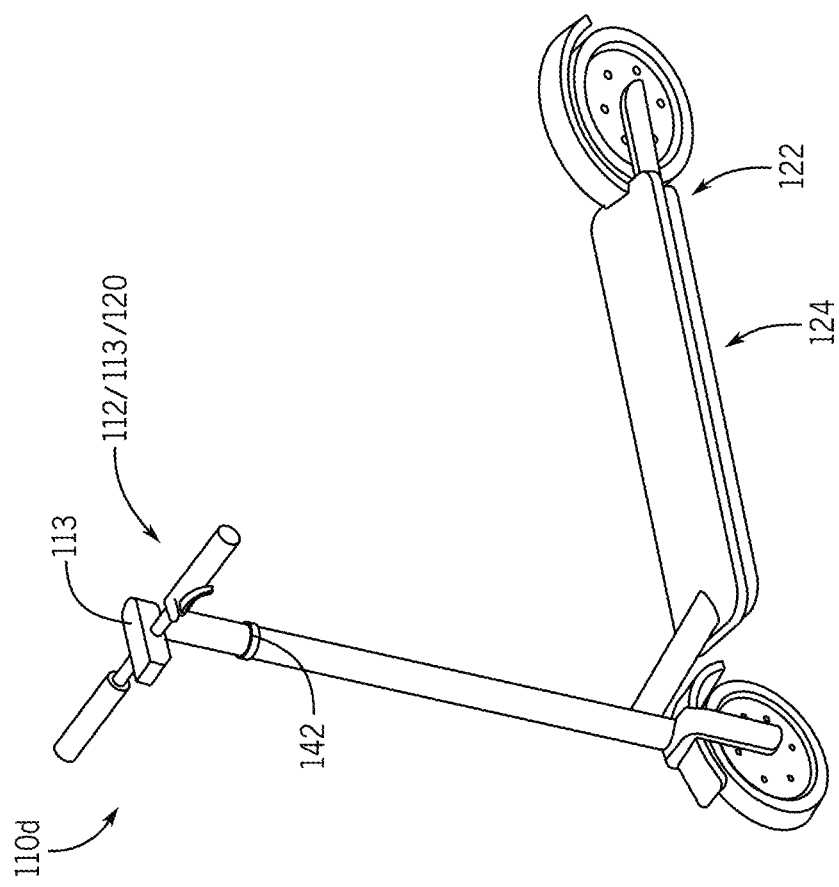

FIGS. 3A, 3B, and 3C illustrate respective diagrams of micromobility transit vehicles 110b, 110c, and 110d, which may be integrated network systems in accordance with an embodiment of the disclosure. For example, transit vehicle 110b of FIG. 3A may correspond to a motorized bicycle integrated with the various elements of system 100 and may be configured to participate in dynamic transportation matching system 200 of FIG. 2. As shown, transit vehicle 110b includes controller/user interface/wireless communications module 112/113/120 (e.g., integrated with a rear fender of transit vehicle 110b), propulsion system 122 configured to provide motive power to at least one of the wheels (e.g., a rear wheel 322) of transit vehicle 110b, battery 124 for powering propulsion system 122 and/or other elements of transit vehicle 110b, docking mechanism 140 (e.g., a spade lock assembly) for docking transit vehicle 110b at a docking station, user storage 146 implemented as a handlebar basket, and vehicle security device (e.g., an embodiment of vehicle security device 144 of FIG. 1), which may incorporate one or more of a locking cable 144a, a pin 144b coupled to a free end of locking cable 144a, a pin latch/insertion point 144c, a frame mount 144d, and a cable/pin holster 144e, as shown (collectively, vehicle security device 144). In some embodiments, controller/user interface/wireless communications module 112/113/120 may alternatively be integrated on and/or within a handlebar enclosure 313, as shown.

In some embodiments, vehicle security device 144 may be implemented as a wheel lock configured to immobilize rear wheel 322 of transit vehicle 110b, such as by engaging pin 144b with spokes of rear wheel 322. In the embodiment shown in FIG. 3A, vehicle security device 144 may be implemented as a cable lock configured to engage with a pin latch on a docking station, for example, or to wrap around and/or through a secure pole, fence, or bicycle rack and engage with pin latch 144c. In various embodiments, vehicle security device 144 may be configured to immobilize transit vehicle 110b by default, thereby requiring a user to transmit a request to management system 240 (e.g., via user device 130) to reserve transit vehicle 110b before attempting to use transit vehicle 110b. The request may identify transit vehicle 110b based on an identifier (e.g., a QR code, a barcode, a serial number, etc.) presented on transit vehicle 110b (e.g., such as by user interface 113 on a rear fender of transit vehicle 110b). Once the request is approved, management system 240 may transmit an unlock signal to transit vehicle 110b (e.g., via network 250). Upon receiving the unlock signal, transit vehicle 110b (e.g., controller 112 of transit vehicle 110b) may release vehicle security device 144 and unlock rear wheel 322 of transit vehicle 110b.

Transit vehicle 110c of FIG. 3B may correspond to a motorized sit-scooter integrated with the various elements of system 100 and may be configured to participate in dynamic transportation matching system 200 of FIG. 2. As shown in FIG. 3B, transit vehicle 110c includes many of the same elements as those discussed with respect to transit vehicle 110b of FIG. 3A. For example, transit vehicle 110c may include user interface 113, propulsion system 122, battery 124, controller/wireless communications module/cockpit enclosure 112/120/312, user storage 146 (e.g., implemented as a storage recess), and operator safety measures 142a and 142b, which may be implemented as various types of headlights, programmable light strips, and/or reflective strips.

Transit vehicle 110d of FIG. 3C may correspond to a motorized stand or kick scooter integrated with the various elements of system 100 and may be configured to participate in dynamic transportation matching system 200 of FIG. 2. As shown in FIG. 3C, transit vehicle 110d includes many of the same elements as those discussed with respect to transit vehicle 110b of FIG. 3A. For example, transit vehicle 110d may include user interface 113, propulsion system 122, battery 124, controller/wireless communications module/ cockpit enclosure 112/120/312, and operator safety measures 140, which may be implemented as various types programmable light strips and/or reflective strips, as shown.

Figure 3D:
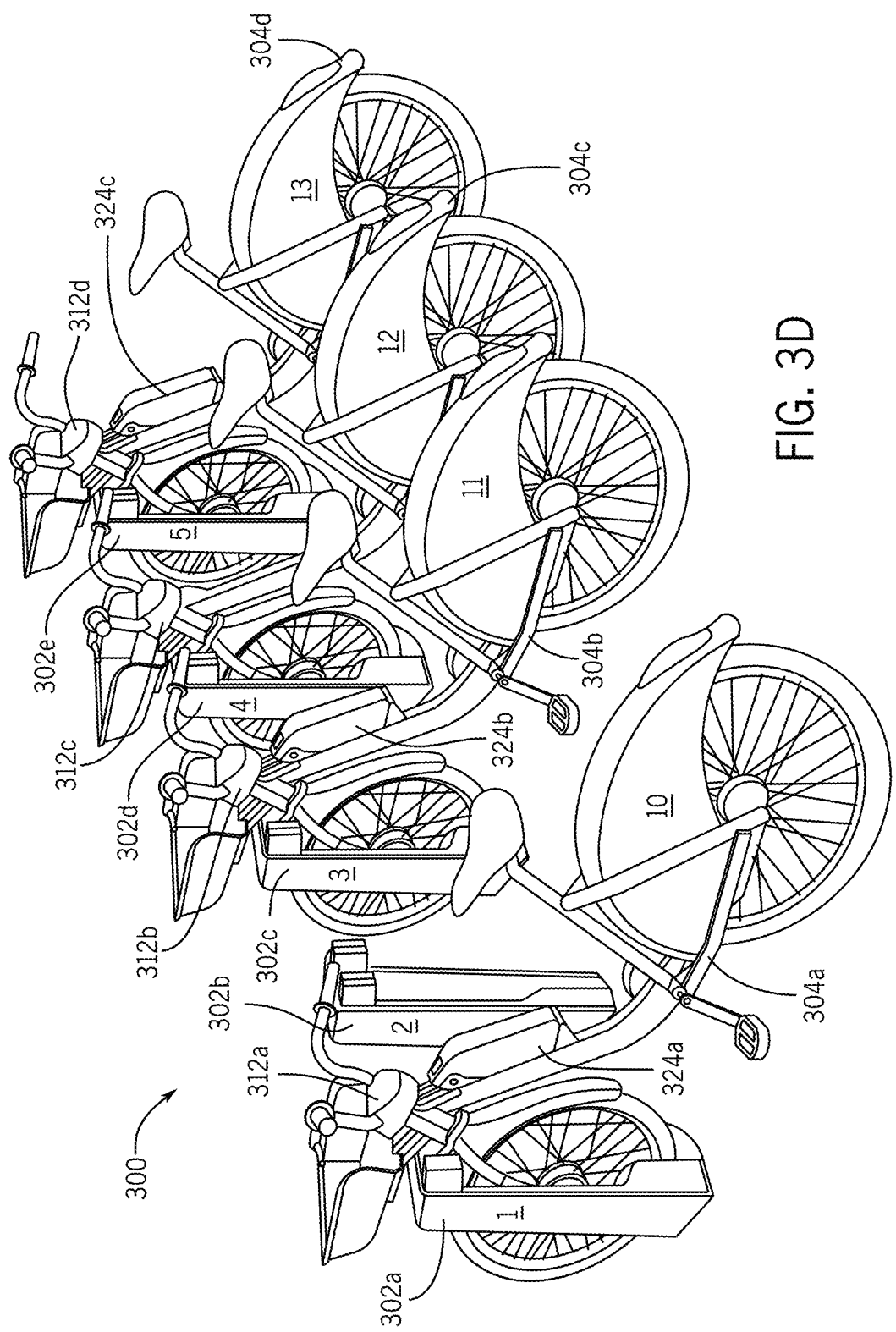
FIG. 3D illustrates a diagram of a docking station for docking one or more micromobility transit vehicles in accordance with an embodiment of the disclosure.

FIG. 3D illustrates a docking station 300 for docking transit vehicles (e.g., transit vehicles 110c, 110e, and 110g, etc.) according to one embodiment. As shown, docking station 300 may include multiple bicycle docks, such as docks 302a-e. In this example, a single transit vehicle (e.g., any one of electric bicycles 304a-d) may dock in each of the docks 302a-e of the docking station 300. Each of the docks 302a-e may include a lock mechanism for receiving and locking docking mechanism 140 of the electric bicycles 304a-d. In some embodiments, once a transit vehicle is docked in a bicycle dock, the dock may be electronically coupled to the transit vehicle (e.g., controllers 312a-d of the transit vehicle) via a link such that the transit vehicle and the dock may communicate with each other via the link.

A user may use a user device (e.g., user device 130) to use a micromobility transit vehicle 110b-d that is docked in one of the bicycle docks 302a-e by transmitting a request to management system 240. Once the request is processed, management system 240 may transmit an unlock signal to a micromobility transit vehicle 110b-d docked in the dock and/or the dock via network 250. The docking station 300 may automatically unlock the lock mechanism to release the micromobility transit vehicle 110b-d based on the unlock signal. In some embodiments, each of the docks 302a-e may also be configured to charge batteries (e.g., batteries 324a-c) of the electric bicycle 304a-d, respectively, when the electric bicycle 304a-d are docked at the docks 302a-e. In some embodiments, docking station 300 may also be configured to transmit information associated with the docking station 300 (e.g., a number of transit vehicles docked at the docking station 300, charge statuses of the docked transit vehicles, etc.) to the management system 240.

Figure 4:
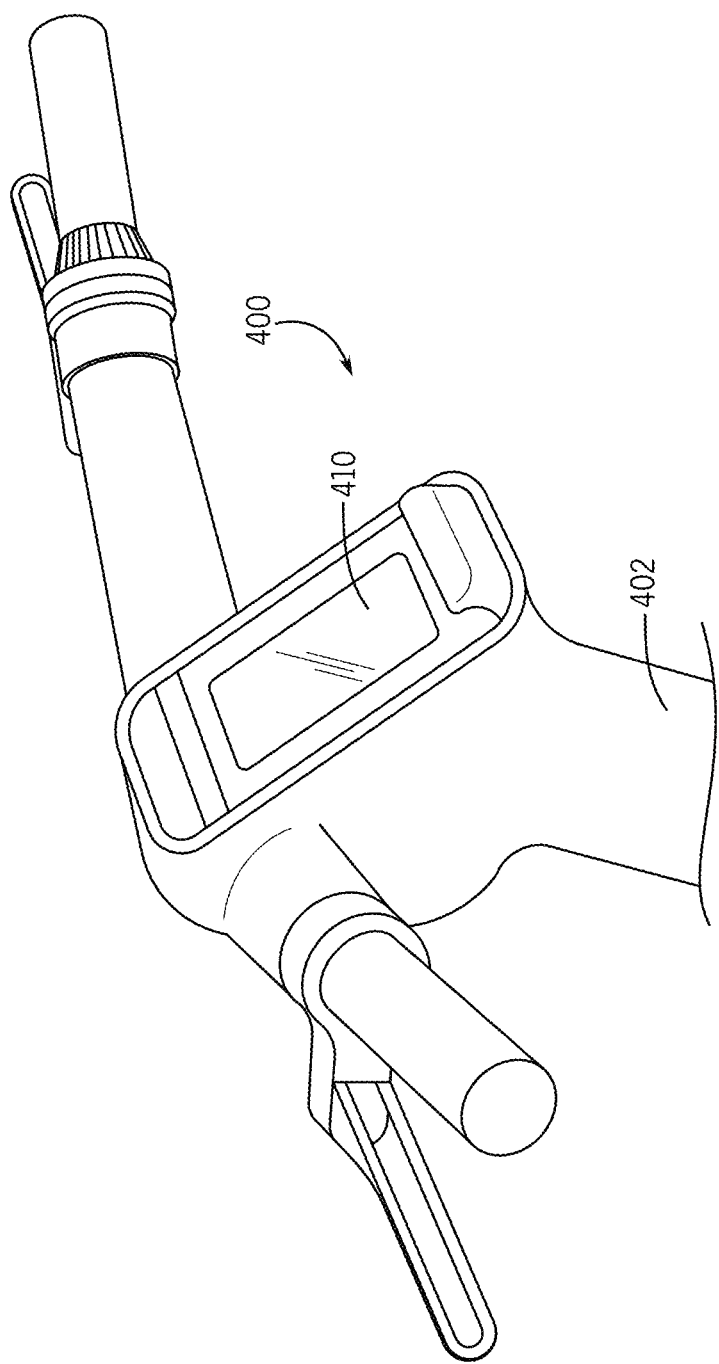
FIG. 4 illustrates a diagram of a user interface associated with a micromobility transit vehicle in accordance with an embodiment of the disclosure.

FIG. 4 illustrates a diagram of a user interface 400 associated with a micromobility transit vehicle 402 in accordance with an embodiment of the disclosure. The micromobility transit vehicle 402 may be similar to any one of transit vehicles 110b, 110c, or 110d, described above. The user interface 400 may be integrated with the micromobility transit vehicle 402, such as integrated with at least a portion of a cockpit of the micromobility transit vehicle 402. In some embodiments, the user interface 400 may form at least a portion of an outer housing of the handlebar of the micromobility transit vehicle 402. The user interface 400 may be visible to the user during operation. For instance, the user interface 400 may generally face rearwardly. The user interface 400 may include a display 410 configured to render information or other data. The display 410 may include many configurations, such as being an electronic ink display, although other configurations are contemplated. In other embodiments, the display 410 may be part of a mobile user computing device, such as a smart phone. As such, content, information, and data discussed herein as being presented on the display 410 can also or alternatively be displayed on the user computing device.

The user interface 400 may be similar to the user interface 113 or 132 described above. For example, route guidance information, usage cost, battery charge status, vehicle range, or other information related to the micromobility transit vehicle 402 may be rendered on the display 410. For instance, the display 410 may render one or more notification related to battery charge such as amount of battery charge that remains (e.g., low, medium, good, or expressed as percentages), whether the battery is malfunctioning or damaged, instructions (including navigational instructions) to take the micromobility transit vehicle 402 to a charging location if the battery requires charging or if the user would like to charge the battery in preparation for a trip, how many useful miles/distance remain based on a current battery charge, what a status of the battery is as it is being charged (e.g., 25%, 50%, 75%, 100%), and so forth. Information related to the operation of the micromobility transit vehicle 402, such as time information, map information, navigation information, instructions for operation, operational warnings or notifications, among others, may be rendered on the display 410. For example, one or more notifications may be rendered on the display 410 instructing or reminding the user to properly lock and/or park the micromobility transit vehicle 402. In some embodiments, the user interface 400 may present information similar to that described in U.S.

patent application Ser. No. 16/578,995, entitled "Micromobility Electric Vehicle with Electronic Device Holder and Integrated Display," which is incorporated herein in its entirety for all purposes.

Figure 5A:
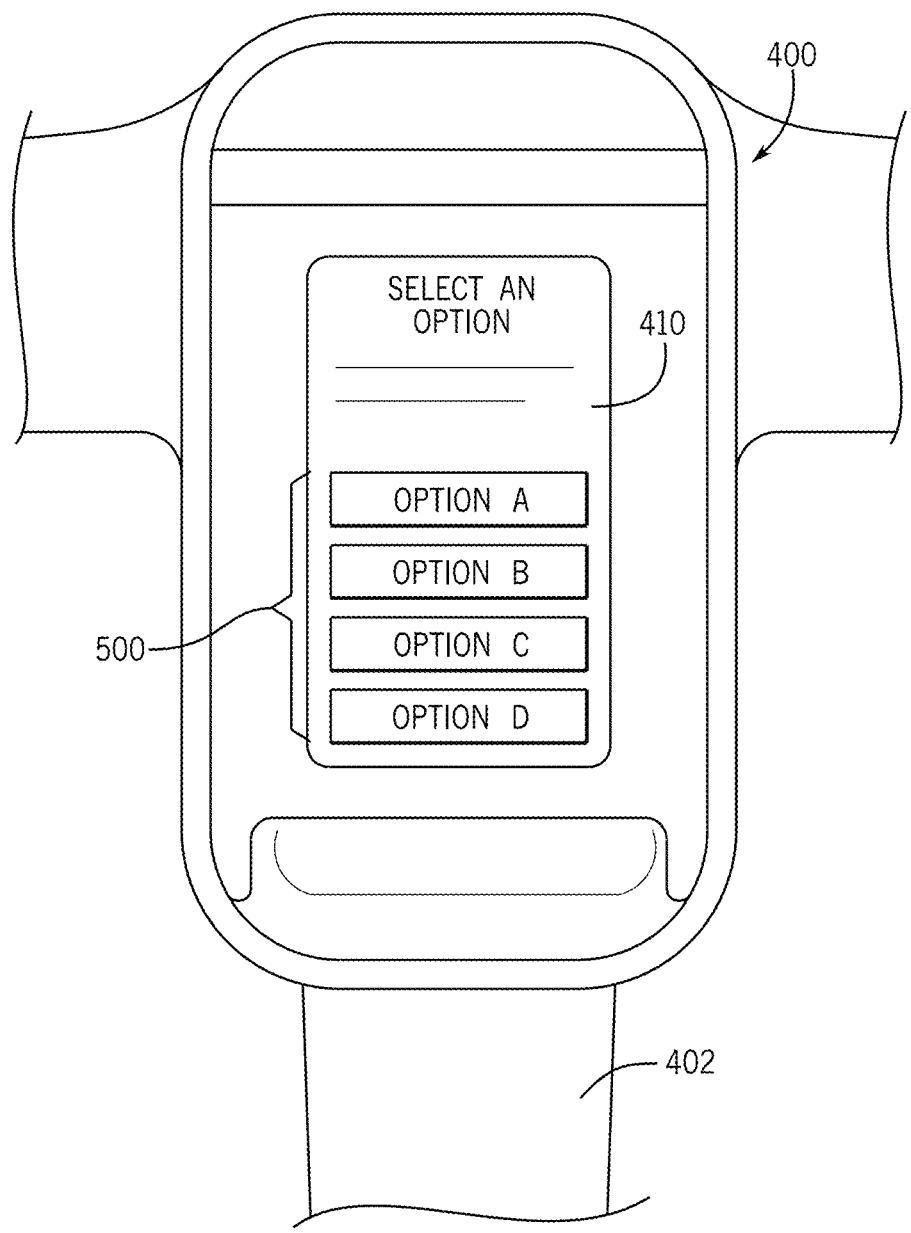
FIGS. 5A, 5B, and 5C illustrate respective diagrams of various examples of information rendered on a display of the user interface of FIG. 4 in accordance with an embodiment of the disclosure.
Figure 5B:
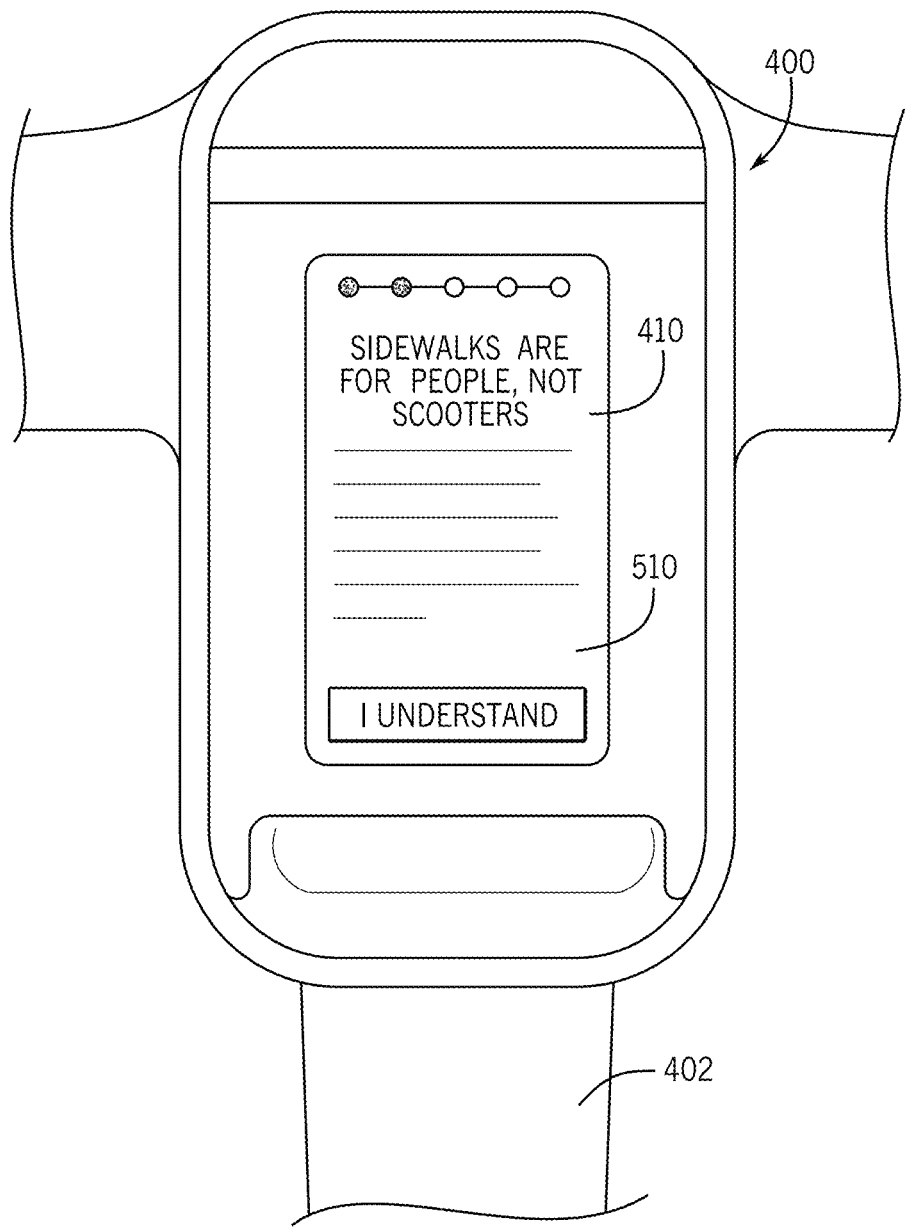
Figure 5C:
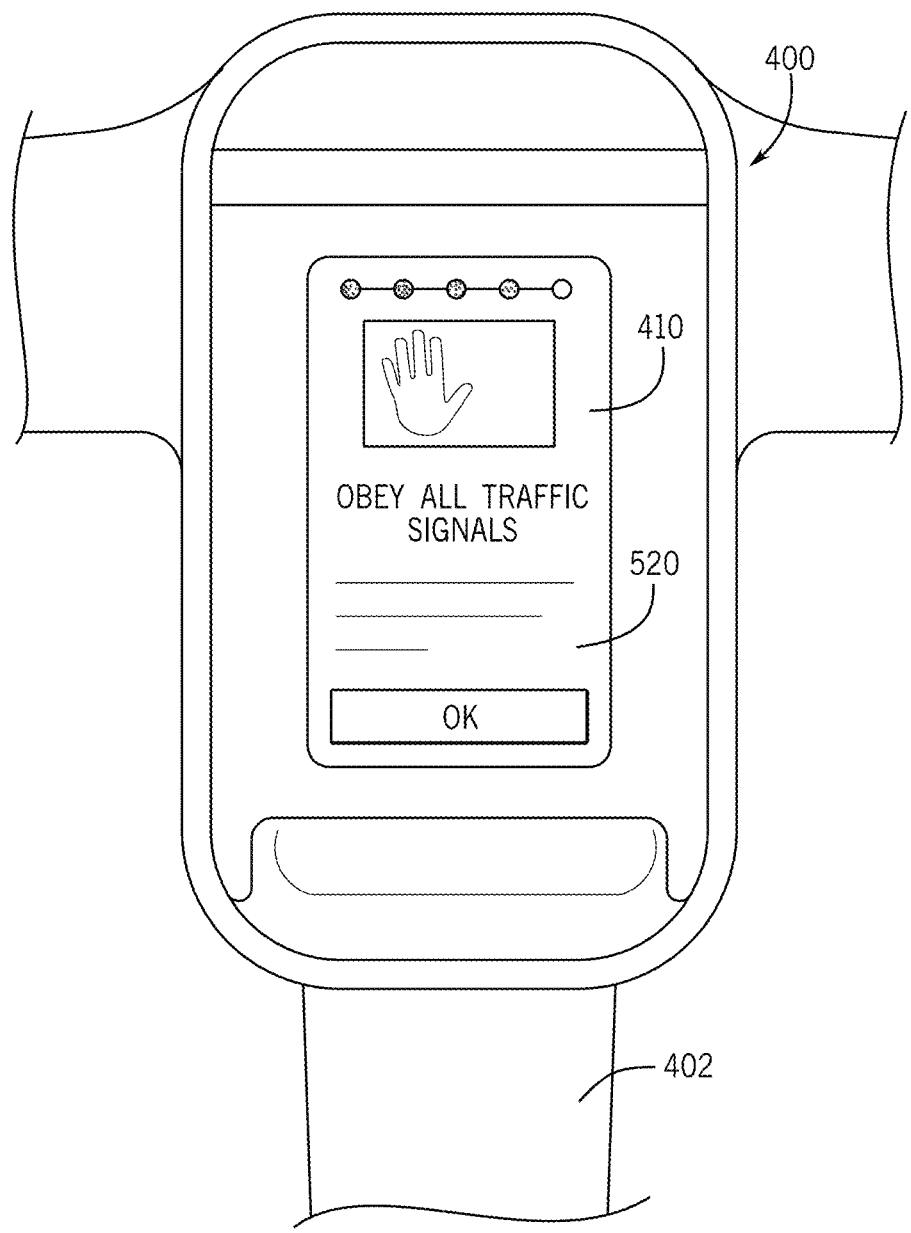

FIGS. 5A, 5B, and 5C illustrate respective diagrams of various examples of information rendered on the display 410 of the user interface 400 in accordance with an embodiment of the disclosure. The display 410 may render various information and different times, such as during operation of the micromobility transit vehicle 402, which includes starting, during, or ending a trip or prior to starting use or after ending a ride of the micromobility transit vehicle 402. For example, as shown in FIG. 5A, the display 410 may render one or more prompts, buttons, or selectable commands (hereinafter "options" 500 for sake of convenience, without intent to limit) for selection. The options 500 may prompt user selection to begin a ride, end a ride, pause a ride, or modify a ride, among others. In some embodiments, the options 500 rendered on the display 410 may allow user selection of one or more navigational commands, such as setting a starting location, setting a destination, starting navigational guidance, ending navigational guidance, modifying an existing navigation route, or the like. In some embodiments, the options 500 rendered on the display 410 may allow a user to unlock the micromobility transit vehicle 402 from a docking station, pair the micromobility transit vehicle 402 to a docking station, request service or maintenance of the micromobility transit vehicle 402, report issues with the micromobility transit vehicle 402, and the like. In some embodiments, the options 500 rendered on the display 410 may allow the user to turn on a headlight assembly, turn off the headlight assembly, or otherwise control operation of one or more systems of the micromobility transit vehicle 402.

Referring to FIG. 5B, the display 410 may render one or more notifications 510 related to operation of the micromobility transit vehicle 402. For instance, the display 410 may render use agreements, local rules and regulations, liability waivers, operation instructions, operation reminders, battery statuses and the like for acknowledgment by the user before, during, or after use of the micromobility transit vehicle 402.

Referring to FIG. 5C, the display 410 may render one or more notifications 520 based on a detected condition of the micromobility transit vehicle 402. For example, the display 410 may render one or more notifications of a detected use violation (e.g., excessive speed detection, traffic signal violation, etc.), parking violation (e.g., on street, within a landscaped area, within a handicapped zone, etc.), lock violation (e.g., free locking, to an improper sign or structure, failure to lock, etc.), or any combination thereof. In other embodiments, the notifications need not be for a violation, but can be for conveying changes during operation of the micromobility transit vehicle 402, providing warnings of upcoming hazards or congestion along the ride or trip, providing reminders for use or operation, providing messages at the start and/or end of a ride, including positive messages if the user has complied with all use regulations or guidelines during the trip or user account updates, such as status, number of rides completed, or total distance traveled on the ride or over multiple rides, and offers or advertisements, such as when the micromobility transit vehicle 402 is detected as being stationary or stopped.

Figure 6A:
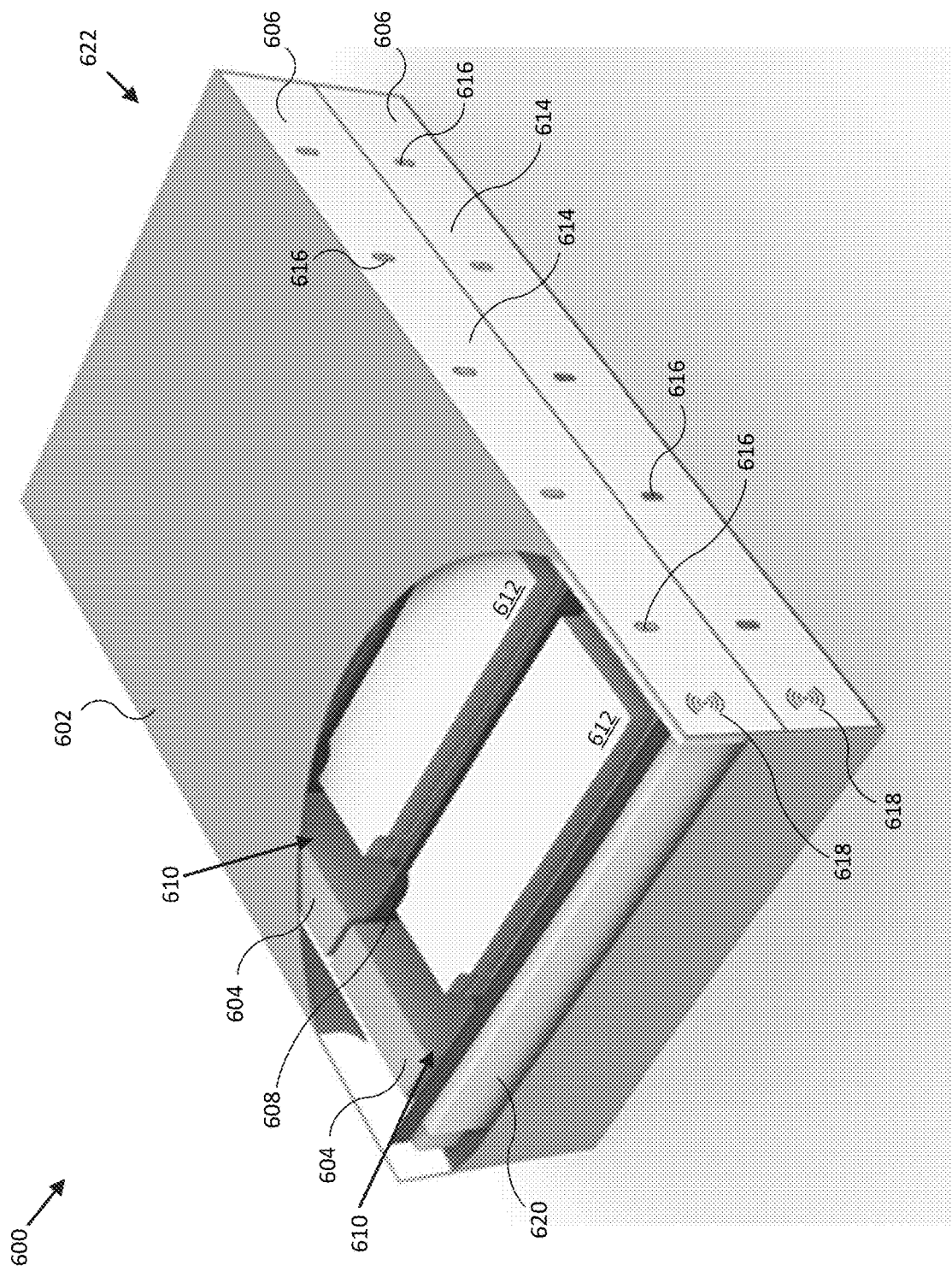
FIGS. 6A-6E illustrate views of example battery charging cabinets for micromobility transit vehicle batteries in accordance with various embodiments of the present disclosure.

FIGS. 6A-6E illustrate various views of a battery charging cabinet 600 in accordance with embodiments of the present disclosure. Referring to FIG. 6A, illustrated is a perspective view of the battery charging cabinet 600 in accordance with one or more embodiments of the present disclosure. The battery charging cabinet 600 includes a housing 602, battery chargers 604, and drawers 606. The housing 602 is partially transparent in FIG. 6A to expose an interior of the housing 602 for illustrative purposes. However, the housing 602 may be opaque, transparent, and/or a combination of transparent and opaque (e.g., translucent) in various implementations. Although the housing 602 is depicted in FIG. 6A as substantially rectangular cuboidal, the housing 602 may be formed in a variety of different configurations to suit a desired application. For example, the housing 602 may be formed to have a shape that complements a space where the battery charging cabinet 600 is intended to be placed and a desired number of drawers 606.

The battery chargers 604 may be disposed in the drawers 606 according to some embodiments. The battery chargers 604 may operate to charge batteries 612 by storing a charge itself and using the stored charge to charge the batteries (e.g., when the battery charging cabinets 600 are in the field and remote from a location that would typically allow the battery charging cabinets to plug in) and/or charging the batteries through energy supplied from an external power source (e.g., when the battery chargers are connected to an outlet and electric grid or electricity generator, automobile outlet and automobile battery, and so forth). For example, each battery charger 604 may be disposed in a corresponding battery dock 610 of the drawer 606. The battery docks 610 may be separated by dividers 608 in various configurations. In some embodiments, the battery docks 610 may have different shapes and sizes to accommodate more than one type of battery 612 docked in the battery charging cabinet 600 for charge. For example, the batteries 612 disposed in the battery docks 610 may be different shaped batteries corresponding to different micromobility transit vehicles. In such cases, the battery charging cabinet 600 may conveniently allow for charging batteries for the different micromobility transit vehicles such as micromobility transit vehicles 110b, 110c, and/or 110d. In other embodiments, the battery docks 610 may be uniform in shape and size but various types/shapes/sizes of batteries 612 may be docked and charged in the charging cabinet 600. In some embodiments, the battery 612 may be the battery 124 discussed in reference to FIG. 1.

Figure 6B:
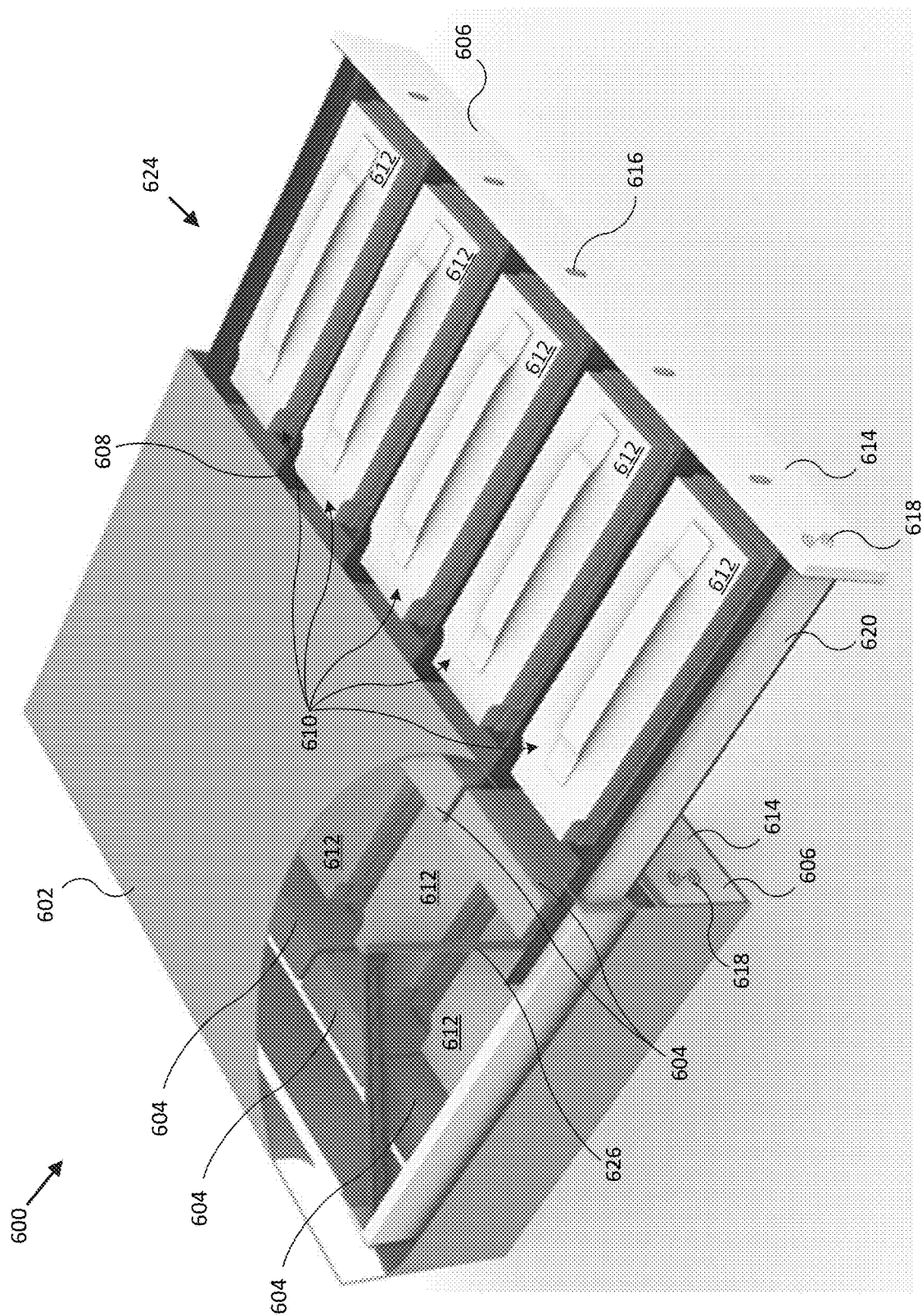
Figure 6C:
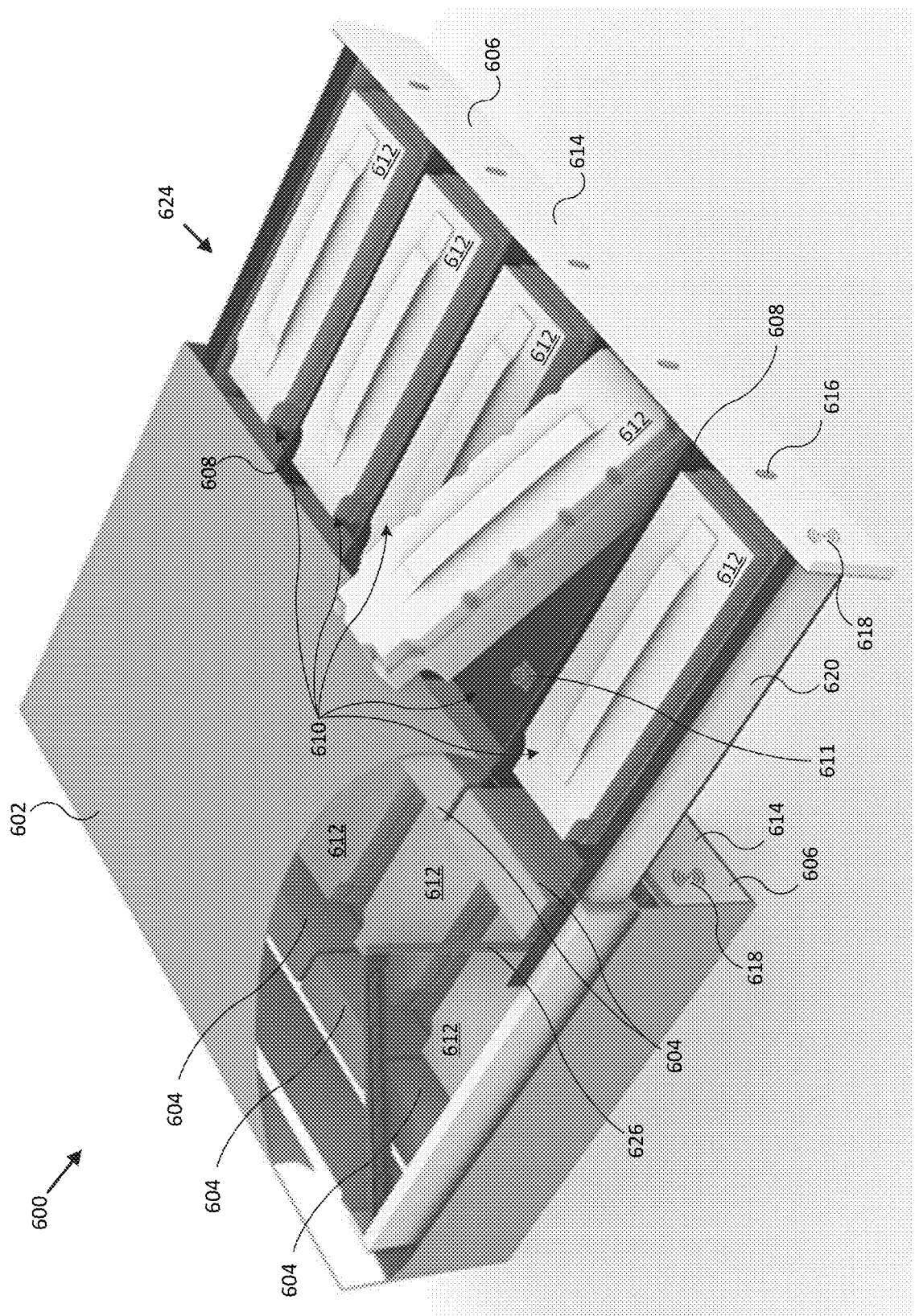
Figure 6D:
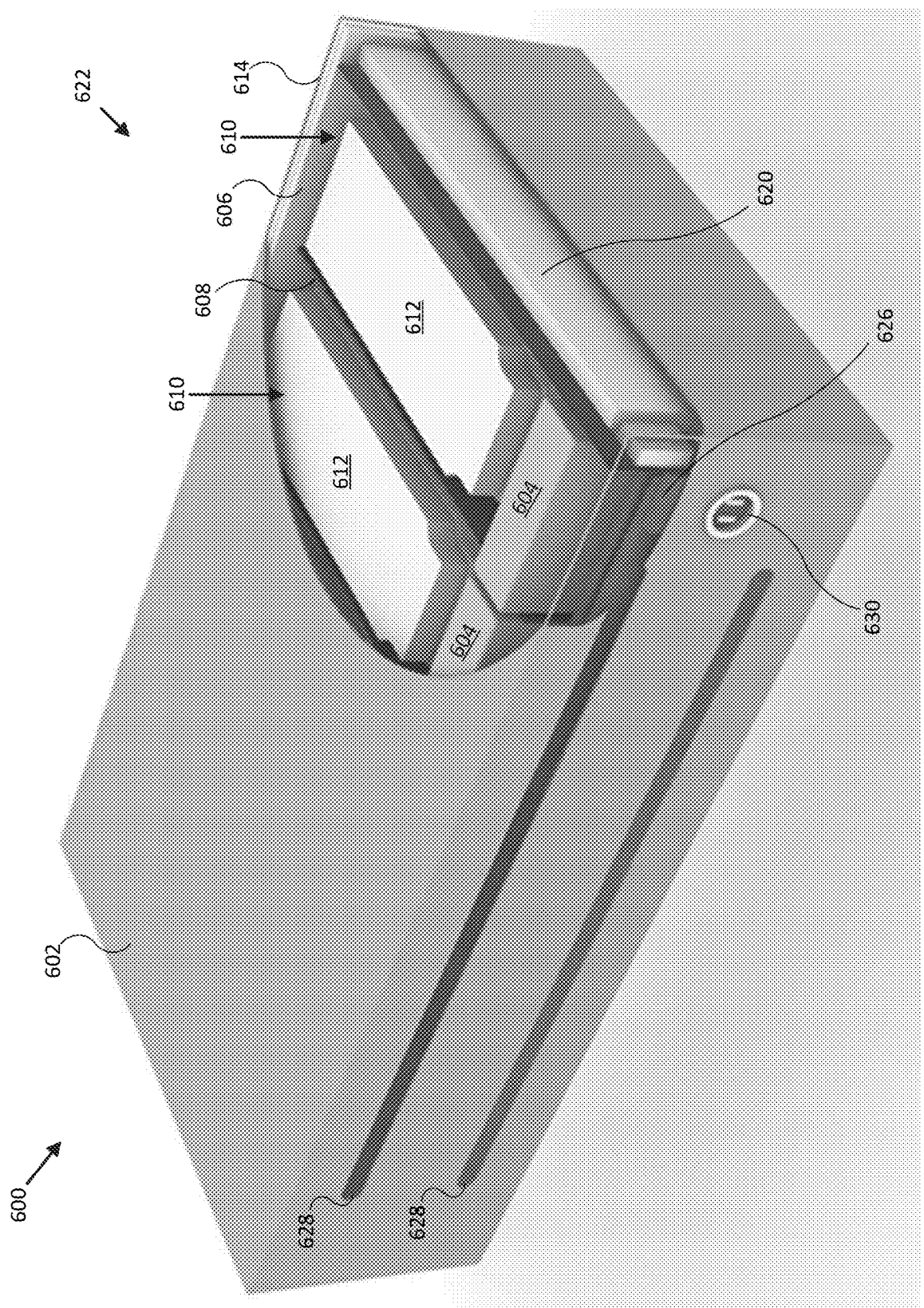

The drawers 606 may slide into and out of the housing 602, for example, between a retracted orientation 622 of FIG. 6A and FIG. 6D and an extended orientation 624 of FIGS. 6B and 6C. In some embodiments, drawer slides 620 may be installed in the battery charging cabinet 600 to facilitate sliding the drawers 606. For example, the drawer slides 620 may be full-extension, soft-close, ball bearing, push to open, and/or self-closing type drawer slides. The drawer slides 620 may be installed in the housing 602 in accordance with a mounting type of the drawer slides 620. For example, the drawer slides may be installed using a bottom mount, center mount, side mount, and/or under-mount type of mounting configuration. The drawer slides 620 and drawers 606 should be sufficiently robust to support a drawer 606 fully loaded with charging batteries 612 and various other components.

In some embodiments, a face 614 of the drawer 606 may have one or more indicators 616 embedded therein or disposed thereon. The indicators 616 may provide visual indications as to one or more characteristics or details related to a corresponding battery dock 610. In this regard, the indicators 616 may be communicatively coupled to the corresponding battery docks 610 to use a readout of the charge of a battery to provide the visual indication. For example, an indicator 616 may indicate a state of charge of a battery 612 disposed in the corresponding battery dock 610. In one implementation, the indicator 616 may be a light-emitting diode (LED) indicator. For example, the indicator 616 may illuminate different colors to indicate various levels of charge of the battery 612. For example, the indicator 616 may illuminate red to indicate that the battery 612 is charging but below a certain threshold charge (e.g., 20%). The indicator 616 may illuminate amber to indicate that the battery 612 is charging and between two threshold charges (e.g., 21% to 99%). The indicator may illuminate green to indicate that the battery 612 is above a threshold charge (e.g., above 99%) or fully charged. As such, a user may be able to quickly glance at the face 614 of the drawers 606 to know a progress of one or more batteries 612 currently charging in the charging cabinet 600. In some embodiments, the indicator 616 may include a progress bar that indicates a progress of a charge of a battery 612. For example, less bars on the progress bar may be illuminated red and as more bars are added to the progress bar, the progress bar can transition to amber and eventually green when the battery 612 is fully charged.

In some embodiments, the face 614 of the drawer 606 may include an electromechanical lock 618. The electromechanical lock 618, for example, may have a near-field communication (NFC) module enabled such that a user can tap a key (e.g., via NFC-enabled mobile device) to the electromechanical lock 618 to cause the electromechanical lock 618 to electromechanically lock a corresponding cabinet drawer 606. In other embodiments, the electromechanical lock 618 may be an RFID lock capable of receiving a passive RFID card/key or active RFID from a mobile device to lock and unlock the drawer 606.

FIG. 6B illustrates a perspective view of the battery charging cabinet 600 with one drawer 606 in an extended orientation 624 in accordance with one or more embodiments of the present disclosure. The battery charging cabinet 600 may include a drawer closer 626. The drawer closer 626 may be a mechanical or electromechanical device that closes a drawer 606 in a controlled manner, preventing it from slamming, after the drawer 606 is opened (e.g., manually or automatically). In an implementation, a force used to open the drawer 606 may be stored in a spring of the drawer closer 626, and when the drawer 606 is released, energy from the spring may be utilized to return the drawer 606 to a retracted orientation 622. In some embodiments, the drawer closer 626 may include a fluid-filled chamber coupled to the spring to utilize hydraulics in closing the drawer 606. In some embodiments, the drawer closer 626 may operate to close the drawer 606 automatically when there is no opposing force such as a user holding the drawer 606 open. In other embodiments, the drawer closer 626 may operate to close the drawer 606 automatically after receiving a sufficient force to close the door. For example, a user may lightly push the drawer 606 but not close the drawer 606 all the way and the drawer closer 626 will pull the drawer 606 the rest of the way into the retracted orientation 622.

As shown in the perspective view of the embodiment of FIG. 6C, the charging cabinet 600 may include an electrical interface 611 in each of the battery docks 610, where each electrical interface 611 may be connected to a respective battery charger 604. For example, the electrical interface 611 may be disposed on a bottom of the drawer 606 to allow for the battery 612 to be placed (e.g., vertically or horizontally) into the battery dock 610 such that contact between the electrical interface 611 and a complementary electrical interface of the battery 612 allows for the battery 612 to begin charging via the battery chargers 604 without requiring a user to manipulate wires or cables. In some embodiments, the electrical interface 611 and battery dock 610 may be similar to a battery mating interface of the batteries' 612 corresponding micromobility transit vehicle. In some cases, the battery 612 may have a strap or handle to facilitate placing the battery 612 into the battery dock 610. In some embodiments, the electrical interface 611 may be a plug or socket to which an electrical interface of the battery 612 may connect. In various embodiments, the electrical interface 611 may be able to receive an adaptor device to allow various battery types to be docked in the battery dock 610 to receive a charge.

As shown in the rear perspective view of the embodiment of FIG. 6D, the battery chargers 604 of each battery dock 610 may be connected to an external power source through a port 630. For example, a connector cable may be inserted into port 630 to distribute power from an external power source to each of the battery chargers 604. For example, each battery charger 604 may connect in a converging fashion to the port 630 such as through an extension block or power board. For example, as shown in the embodiment of FIG. 6J, each battery charger 604 may connect to a single power source (depicted as "AC" in FIG. 6J). Some batteries/chargers may require different pin connectors and current ratings. For example, a smaller battery such as battery 612b of FIG. 6I may use a 16-pin connector at 8A current rating for each pin while battery 612a of FIG. 6I may use a 12-pin connector at 16A current rating for each pin. In some embodiments, larger chargers may be suitable for both large and small batteries as charging power may be reduced when smaller batteries are charged. In some cases, the drawers 606 may have a blind mate or cable track/carrier to deliver power to the batteries 612 while charging. Although the port 630 is depicted in FIG. 6D on a rear side of the housing 602, the port 630 may be disposed on another side (e.g., side, underside, topside) to suit a desired application. For example, the port 630 may be disposed on a side, underside, or topside of the housing 602 such that the battery charging cabinet 600 can be placed closer to a back wall and the port 630 can more easily be accessed by a user. Various cable management methods may be used according to several embodiments. For example, cabling may be contained in the rear of the drawer 606 (e.g., behind the batteries 612 when the batteries are docked in the battery docks 610) or on a side of the drawer 606 (e.g., in a cable retention mount disposed on the side of the drawer 606).

According to some embodiments, the battery charging cabinet 600 may include one or more heat dissipation slots 628 that provide an airflow between the internal components of the battery charging cabinet 600 and an external airspace. Thus, the internal components may be cooled by a heat transfer facilitated by the airflow. In one embodiment, the heat dissipation slots 628 may be defined in a rear side of the housing 602 adjacent to the battery chargers 604 when the drawer 606 is in a retracted orientation 622. In various embodiments, the housing 602 may have a heat dissipation slot 628 for each drawer 606 of the battery charging cabinet 600. A heat dissipation slot 628 may be aligned directly behind each row of battery chargers 604 in such implementations, for example. In some embodiments, one or more ducted fans may be disposed in the battery charging cabinet 600 with appropriate inlet(s) and outlet(s) defined and/or disposed in the battery charging cabinet 600 to further cool internal components of the battery charging cabinet 600.

While the heat dissipation slots 628 are shown as slots substantially extending over a width of the battery charging cabinet 600 in FIG. 6D, it is contemplated that various heat dissipation opening configurations may be implemented. For example, a number of orifices may be defined in the housing 602 walls to provide heat dissipation. Furthermore, the heat dissipation slots 628 may be disposed on a side, topside, and/or underside of the housing 602 to provide the desired airflow to cool the internal components of the battery charging cabinet 600.

Figure 6E:
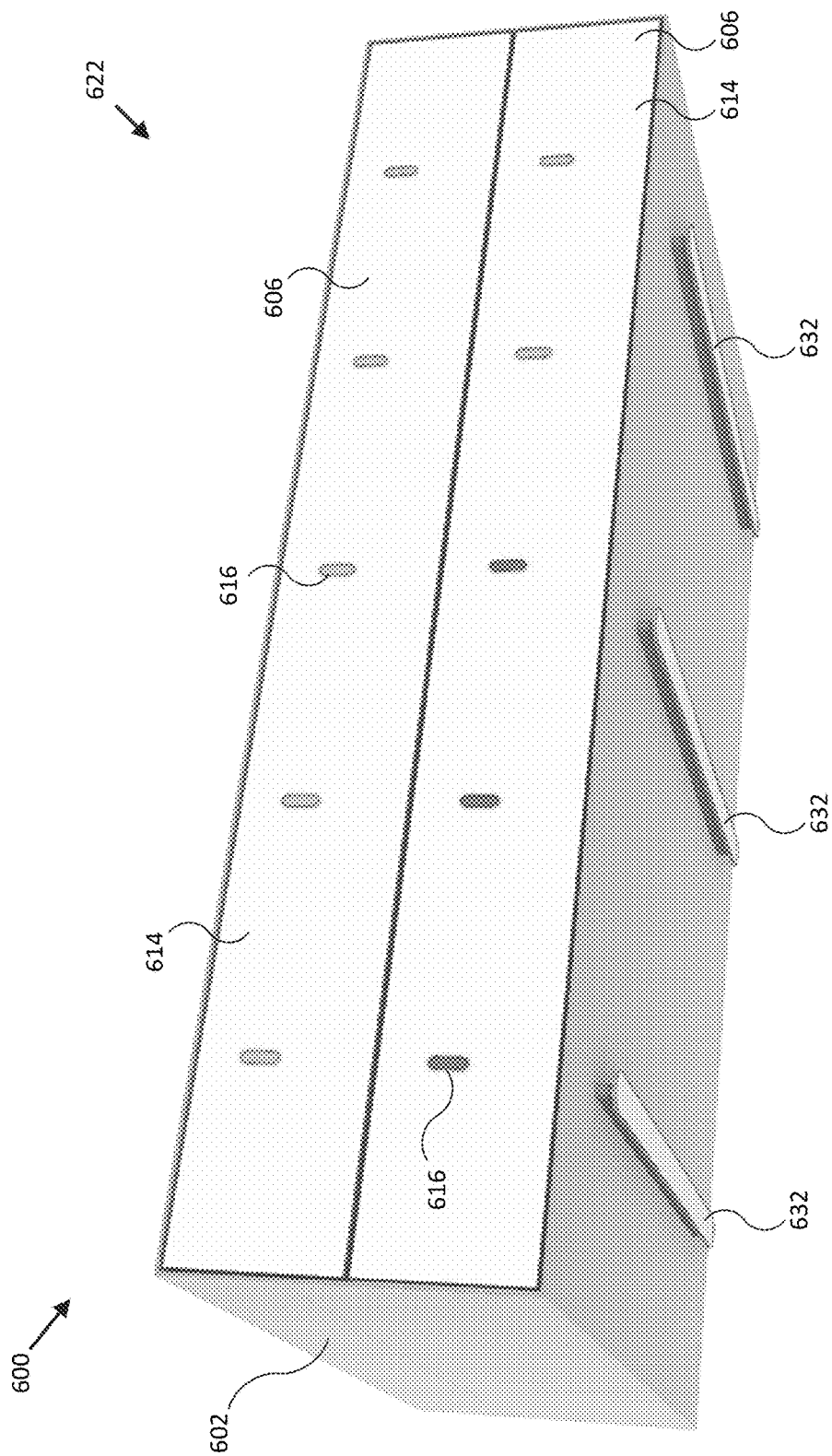

FIG. 6E illustrates a perspective view of an embodiment in which the battery charging cabinets 600 includes a mounting interface 632. For example, the mounting interface 632 may be disposed on a side (e.g., side, underside, topside) of the housing 602. For example, the mounting interface 632 may be or may include mounting rails configured to interlock with a receiving mounting interface such that the battery charging cabinet 600 may be securely mounted/locked into place in a desired location. For example, the receiving mounting interface may latch around the mounting rails to hold the battery charging cabinet 600 in place.

In some embodiments, the mounting interface 632 may be used to link several battery charging cabinets together. For example, the mounting interface 632 of one battery charging cabinet 600 may interlock with a receiving mounting interface disposed on another battery charging cabinet. In this regard, the mounting receiving interface on the other battery charging cabinet may be disposed on a side, underside, and/or topside to allow for the battery charging cabinets to interlock. Thus, the battery charging cabinets can be vertically stacked and/or aligned side by side to form a conjoined unit.

In various embodiments, a battery charging station may include a number of battery charging cabinets 600. For example, a number of battery charging cabinets can be vertically stacked and/or aligned side by side along a wall in a warehouse (or other building), on a table, on the ground in columns and rows to create a battery charging station that is convenient to access and allows for batteries to quickly be swapped in and out of battery docks 610.

Figure 6F:
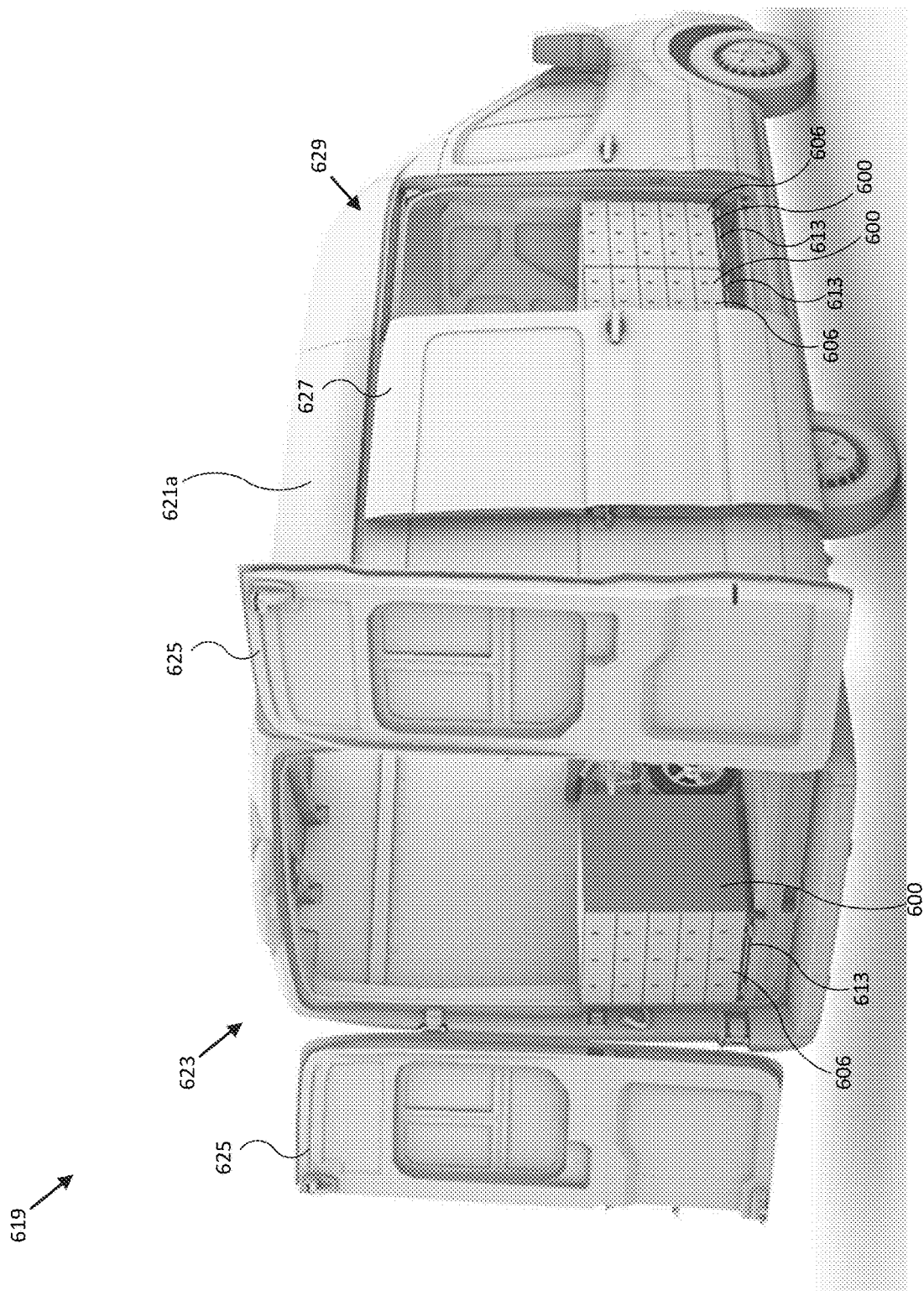

In some embodiments, a battery charging station may include one or more battery charging cabinets 600 installed (e.g., via a receiving mounting interface or system 613) in a transportation vehicle to allow for remote/mobile battery charging. FIGS. 6F-6H illustrate different embodiments of battery charging stations 619 that include battery charging cabinets installed on vehicles 621a, 621b, and 621c. For example, vehicle 621a may be a van type vehicle. The battery charging cabinets 600 may be installed in the van so as to be easily accessible by a user. For example, one or more battery charging cabinets 600 may be installed near a rear entry 623 of the vehicle 621a such that the battery charging cabinet drawers 606 can be conveniently accessed by a user standing outside the vehicle 621a after opening doors 625. As another example, one or more battery charging cabinets 600 may be installed near a side entry 629 of the vehicle 621a such that the battery charging cabinet drawers 606 can be conveniently accessed by a user standing outside of the vehicle 621a after opening sliding door 627.

As shown in the embodiment of FIG. 6G, the battery charging cabinets 600 may be installed in the vehicle 621b such that the battery charging cabinets 600 are conveniently accessed by a user standing outside of the vehicle 621b. For example, the vehicle 621b may be a light electric and/or internal combustion engine type truck that has a truck bed 631. For example, the battery charging cabinets 600 may be installed into the truck bed 631 of the vehicle 621b. In such cases, the battery charging cabinets 600 may have a waterproof seal around its components (e.g., housing 602, drawers 606) to prevent water or any other environmental debris from entering the battery charging cabinet 600 as the vehicle 621b is driven about an environment. In other embodiments, shrouds may be used for ingress protection. It will be appreciated that the battery charging cabinets 600 may be modular to allow for different arrangements for installing and removal on the vehicle 621b (or the vehicles 621a and 621c). For example, some arrangements may allow for easier access to drawers 606 of the cabinets 600. In this regard, interface hardware of the cabinet and the vehicle 621 (or vehicles 621a and 621c) may be implemented for convenient swapping out and arranging of cabinets 600. In some cases, the convenient movability of cabinets 600 may allow for additional storage of micromobility transit vehicles in their place as needed when a service technician is out in the field.

As shown in the embodiment of FIG. 6H, the battery charging cabinet 600 may be installed in the vehicle 621c such that the battery charging cabinets 600 are conveniently accessed by a user standing next to the vehicle 621c. For example, the vehicle 621b may be an electric and/or manually powered cargo bike. For example, one or more battery charging cabinets 600 may be installed in a front compartment 633 of the vehicle 621c. The port 635 may allow for charging a battery of the vehicle 621c and/or the batteries 612 docked in the battery charging cabinet 600 as discussed above.

Thus, it will be appreciated that a battery charging station 619 may be a stationary station that includes one or more battery charging cabinets 600 placed in a warehouse, home, building, on walls, tables, storage racks, and/or shelves; or the battery charging station may be a mobile/remote station that includes one or more battery charging cabinets 600 installed on a vehicle. In some cases, the battery charging station 619 may be a stationary station and/or a mobile station, for example, such as when vehicles are parked in a warehouse and battery charging cabinets 600 installed in the vehicles are used as a stationary battery charging station. As a further example, the vehicles may be parked for charging their batteries and while the vehicles are charging, batteries in the battery charging cabinets 600 installed in the vehicles may also be charged.

In the use case where the battery charging station is mobile, batteries 612 may be charged as a user is driving to each of the locations of the micromobility transit vehicle in service to swap out their batteries 612. As the batteries 612 can be charged as the user moves from location to location of the micromobility transit vehicles requiring replacement batteries, time and cost associated with swapping out the batteries 612 can be reduced.

Figure 6I:
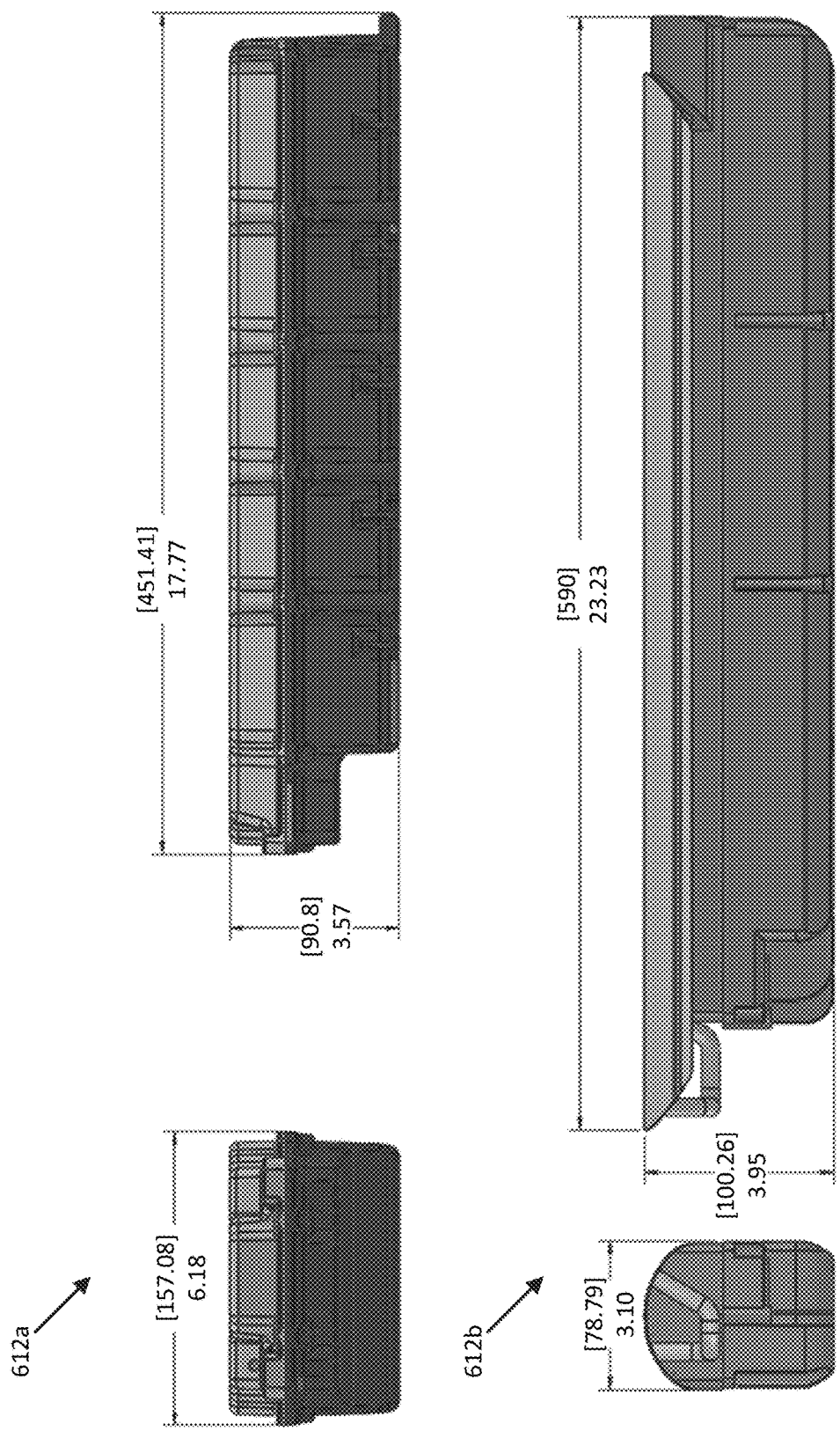
FIG. 6I illustrates various examples of micromobility transit vehicle batteries in accordance with one or more embodiments of the disclosure.
Figure 6J:
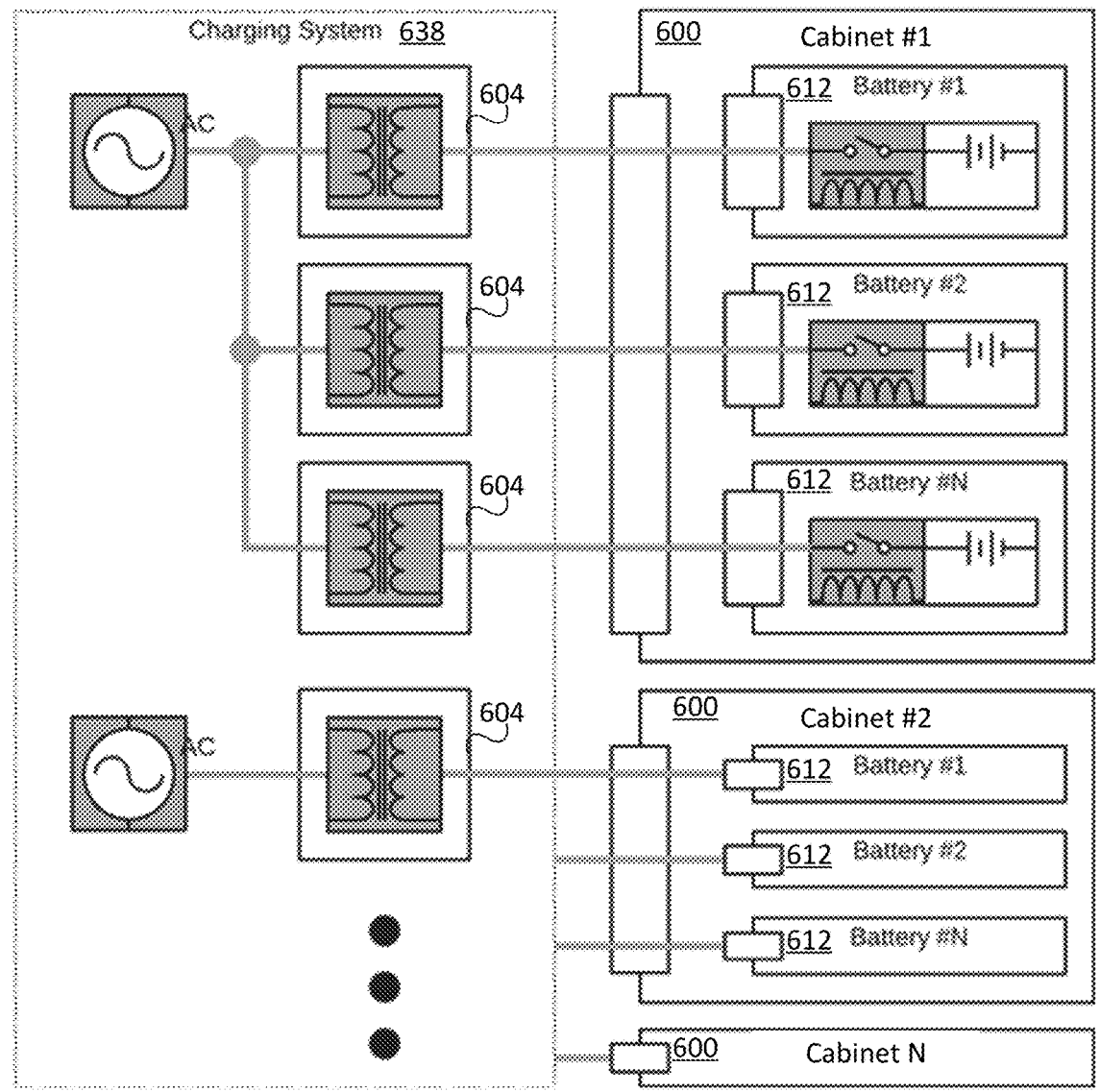
FIG. 6J-6L illustrate diagrams of example charging systems for battery charging cabinets in accordance with one or more embodiments of the disclosure.

FIG. 6I illustrates a diagram of various views of batteries 612a and 612b in accordance with one or more embodiments of the present disclosure. For example, battery 612 may be one of battery 612a or battery 612b. In some embodiments, batteries 612a and 612b may be batteries that correspond to different micromobility transit vehicles. For example, battery 612a may be a larger battery than battery 612b and correspond to a larger micromobility transit vehicle such as micromobility transit vehicle 110c of FIG. 3B. Battery 612b may correspond to micromobility transit vehicle 110b of FIG. 3A for example. Embodiments of the battery charging cabinets 600 discussed herein may be configured to dock and charge various types of batteries including batteries 612a and 612b. The various types of batteries may have different dimensions (as shown in FIG. 6I), mass, capacity, and features such as carrying handles/straps. For example, battery 612a may have a mass of approximately 10 kg and battery 612b may have a mass of approximately 3.4 kg. As another example, battery 612a may have a capacity of approximately 1500 Wh and battery 612b may have a capacity of approximately 750 Wh.

Figure 6K:
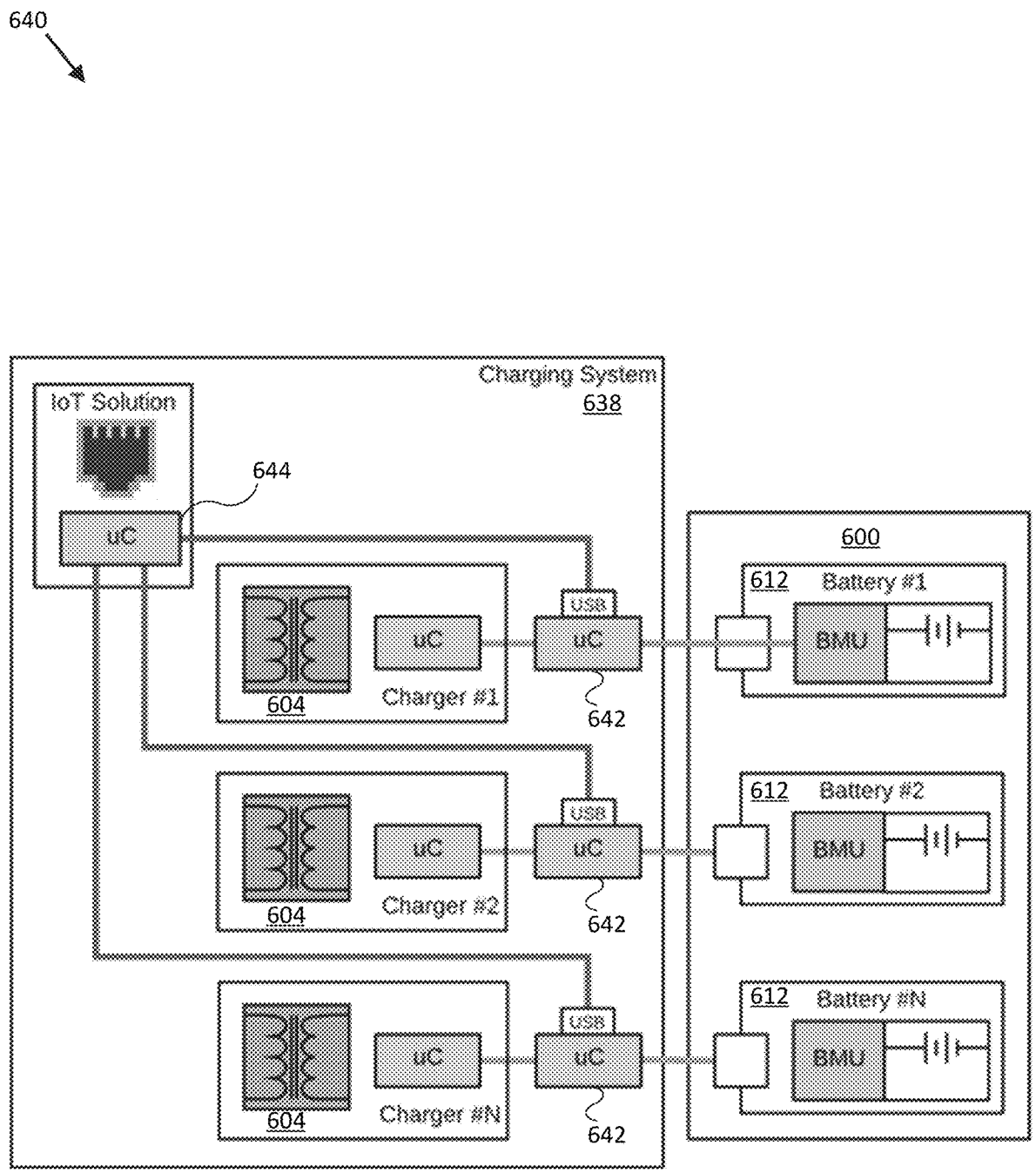
Figure 6L:
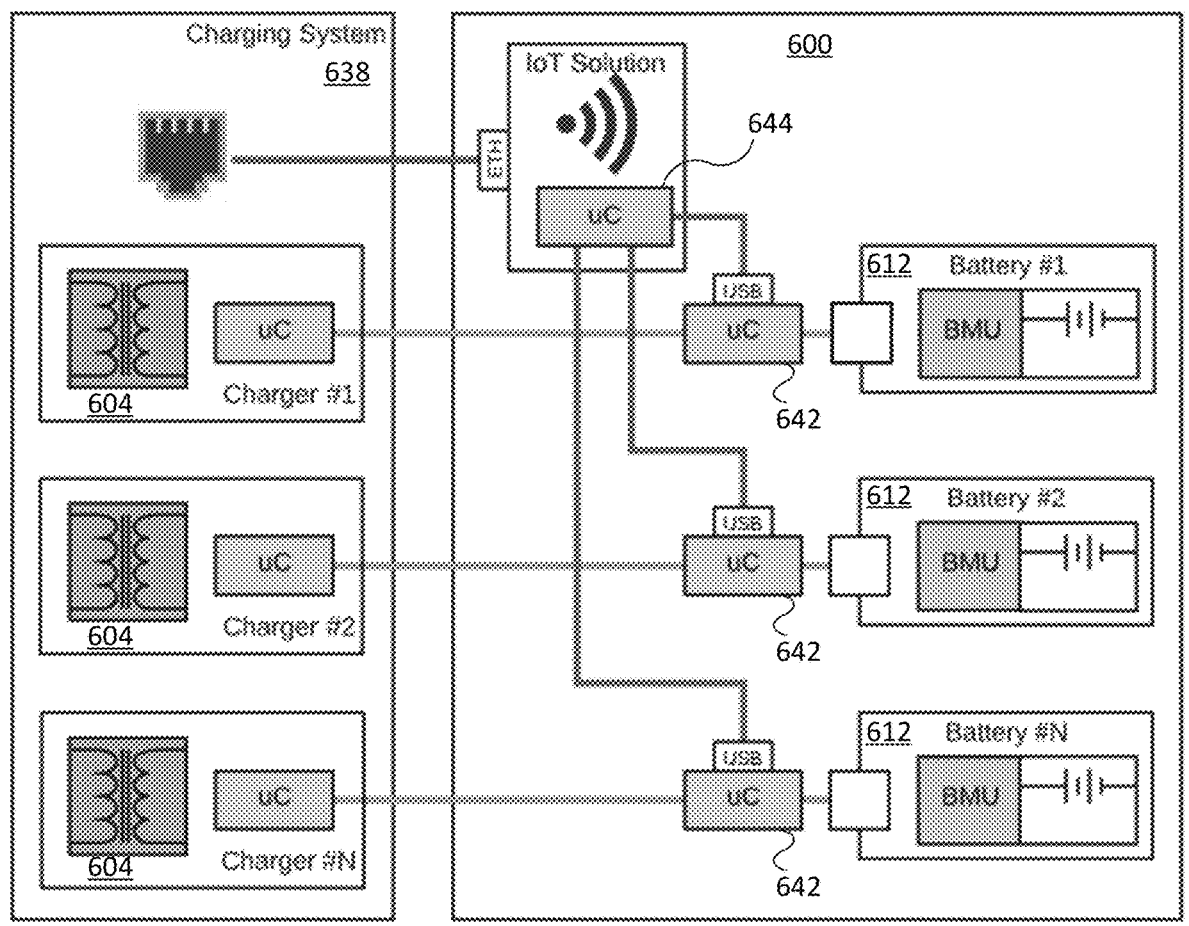

FIG. 6K illustrates a diagram of a semi-distributed controller network 640 in accordance with one or more embodiments of the present disclosure. A battery charging system 638 for a battery charging cabinet 600 may include a battery charger 604 for each battery 612 placed in the battery charging cabinet 600 for storage/charging. The battery charging system 638 may have a gateway controller 642 for each battery charger 604 and battery 612 pair to allow for data upload to an Internet of Things (IoT) solution via USB and/or any wireless communications/devices. The gateway controller 642 may regulate battery charging according to commands/instructions received from the master controller 644 of the IoT solution. For example, the master controller 644 may prioritize charging of batteries 612 based on their state of charge (e.g., batteries near full-charge may be prioritized so that they can complete a charge before other batteries are charged). One advantage to using a distributed controller network 640 may be that a single controller failure would not cause failure for the whole charging system 638. FIG. 6L illustrates an embodiment in which the microcontrollers 642 of the charging system 638 of FIG. 6K are disposed in the battery charging cabinet 600. In one embodiment, an LTE communication may be used for the battery charging cabinet 600 to wirelessly connect the battery charging cabinet 600 to the IoT solution. When the battery charging cabinet 600 is in a local depot (e.g., charging facility, warehouse, etc.), it may switch to a WiFi connection automatically. In another embodiment, the battery charging cabinet 600 may be equipped with 3G data communication hardware/software to wireless connect to the IoT solution while the charging cabinet 600 is connected via Ethernet to the charging system 638. In an embodiment, the IoT of the battery charging cabinet 600 may be connected directly with individual BMU (battery management unit) CAN (e.g., controller area network) buses. In other embodiments, a USB interface may be used.

Figure 6M:
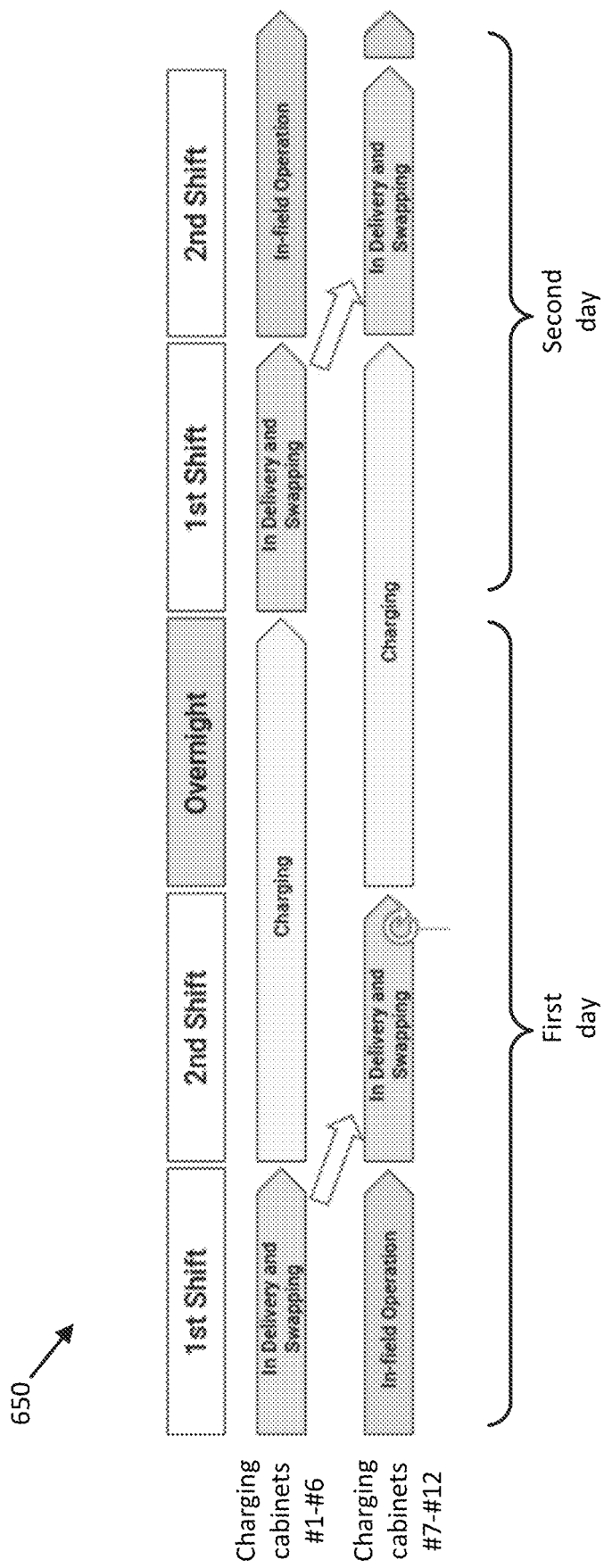
FIG. 6M illustrates an example battery servicing schedule in accordance with one or more embodiments of the disclosure.

FIG. 6M illustrates a flow diagram of an example process 650 for scheduling battery servicing (e.g., delivery, charging, swapping, storage) for micromobility transit vehicles. In the example shown in FIG. 6M, there are twelve charging cabinets #1 through #12 split between two 8-hour shifts on each day. During the first shift on the first day, batteries 612 may be delivered and swapped in micromobility transit vehicles for cabinets #1 through #6 while batteries 612 for cabinets #7 through #12 are in field operation or charging. During the second shift on the first day, batteries 612 corresponding to cabinets #1 through #6 may be charged through the night shift. During the second shift on the first day, batteries 612 for cabinets #7 through #12 may be delivered and swapped in micromobility transit vehicles in the field until the night shift where the batteries placed in the cabinets #7 through #12 during the swapping are now charged through the first shift of the second day. In the first shift of the second day, batteries that charged in cabinets #1 through #6 overnight will be out for delivery and swapping. In the second shift of the second day, the batteries delivered and swapped from cabinets #1 through #6 will be in field operation while batteries in cabinets #7 through #12 will be out for delivery and swapping. The example process 650 is not intended to be limiting and is simply an example for battery servicing for micromobility transit vehicles. The process 650 may be scaled as appropriate depending on a number of batteries, cabinets, micromobility transit vehicles, average charge time for batteries, and so forth.

Figure 6N:
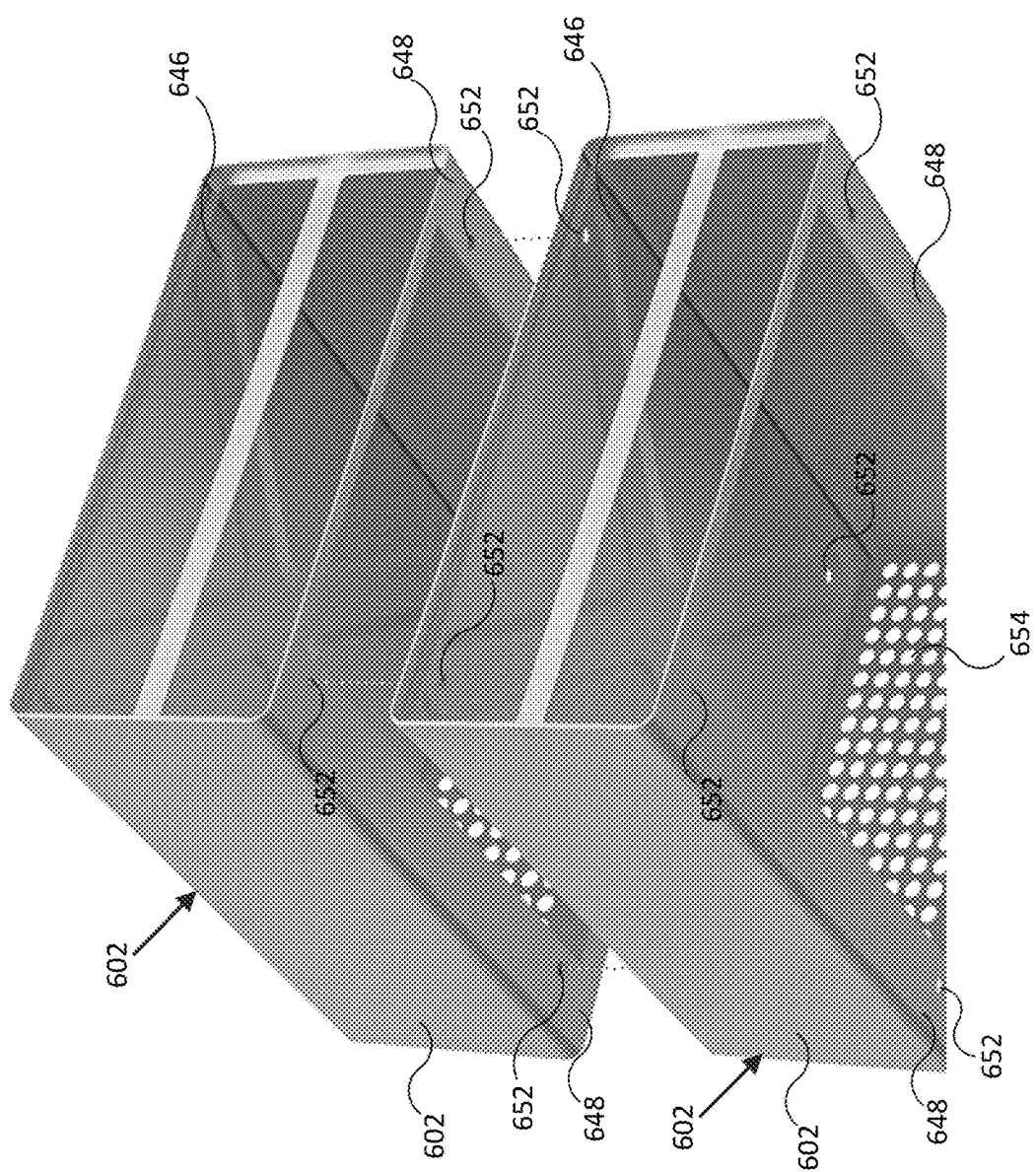
FIG. 6N illustrates a diagram of modular battery charging cabinets capable of stacking upon each other in accordance with one or more embodiments of the disclosure.
Figure 60:
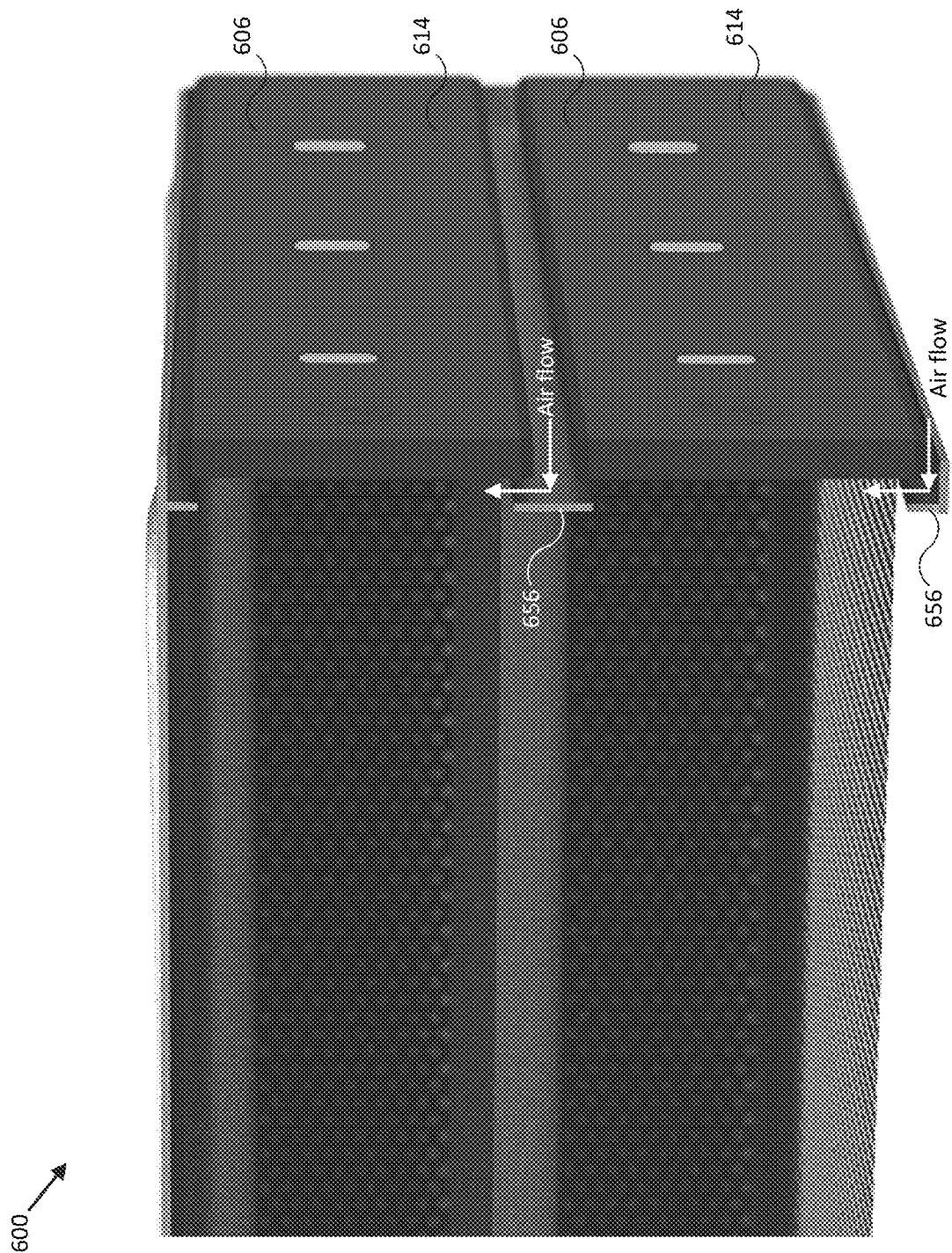

FIG. 6N illustrates a diagram of battery charging cabinet housings 602 configured to stack upon each other in accordance with one or more embodiments of the present disclosure. The battery charging cabinet housing may have a top surface 646, which may have fastener holes 652 that align with fastener holes 652 of a bottom surface 648 of the housing 602. The fastener holes may be threaded to allow for fasteners inserted therein to secure the cabinet housing 602 in a stacked assembly. In some embodiments, the cabinet housing 602 may have a rear surface 654 in which heat dissipation orifices or ventilation may be defined to facilitate heat transfer (e.g., cooling) of any components disposed inside the housing 602. FIG. 6O illustrates a diagram of a battery charging cabinet 600 in which drawers 606 have an airflow channel 656 to allow for air to flow underneath the face 614 of the drawer 606 and along the bottom of the drawer 606. The air flowing through the airflow channel 656 may further facilitate cooling of internal components. In some embodiments, where a ducted fan is used in the charging cabinet 600, the airflow channel 656 may be used as an inlet or an outlet for air flow.

Figure 7:
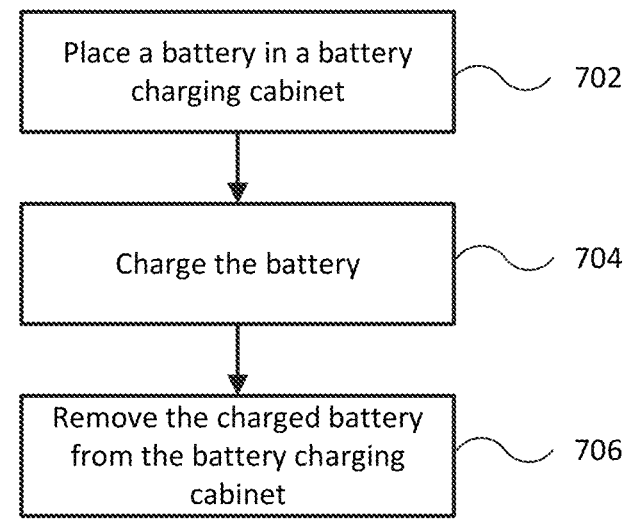
FIG. 7 illustrates a flowchart of a process for using a battery charging cabinet in accordance with one or more embodiments of the present disclosure.

FIG. 7 illustrates a flow diagram of a process 700 for using the battery charging cabinet 600 in accordance with embodiments of the present disclosure. It should be appreciated that any step, sub-step, sub-process, or block of process 700 may be performed in an order or arrangement different from the embodiments illustrated by FIG. 7. For example, one or more blocks may be omitted from or added to the process 700. Although process 700 is described with reference to the embodiments of FIGS. 6A-6H, process 700 is not limited to such embodiments.

In some embodiments, the battery 612 may correspond to a micromobility transit vehicle (e.g., transit vehicles 110, 110b, 110c, or 110d). The battery 612 may be removed from the micromobility transit vehicle and brought to the battery charging cabinet 600 for charging. For example, the battery charging cabinet 600 may be part of a battery charging station 619.

At block 702, the battery 612 is placed in the battery charging cabinet 600. For example, the battery 612 may be placed in the battery dock 610 of the drawer 606 such that an electrical interface of the battery 612 is connected to the electrical interface 611 of the battery dock 610. In some cases, a user may perform an NFP touch, RFID tag/card/key touch or otherwise unlock the drawers 606 of the battery charge cabinet 600. The drawer 606 may be slid/extended out of the housing 602 into an extended orientation 624 such that the battery 612 can be placed in the battery dock 610. The drawer 606 may automatically retract into a retracted orientation 622 via the drawer closer 626 once the battery 612 has been placed in the battery dock 610 (e.g., with no or minimal external force from a user), or the drawer may be manually closed into the retracted orientation 622.

At block 704, the battery 612 is charged in the battery dock 610. For example, the corresponding battery charger 604 of the battery dock 610 may charge the battery 612. An indicator 616 corresponding to the battery dock 610 may provide a visual indication of a progress of the charge of battery 612 on a face of the drawer 606.

At block 706, the battery 612 is removed from the battery charging cabinet 600. For example, a user may see that the indicator 616 indicates that the battery 612 is fully charged. The drawer 606 may be slid/extended to an extended orientation 624, and the battery may be disconnected from the electrical interface 611 and removed from the battery dock 610 of the drawer 606. In some embodiments, the charged battery 612 may be placed in the micromobility transit vehicle to power one or more systems of the micromobility transit vehicle.

Figure 8:
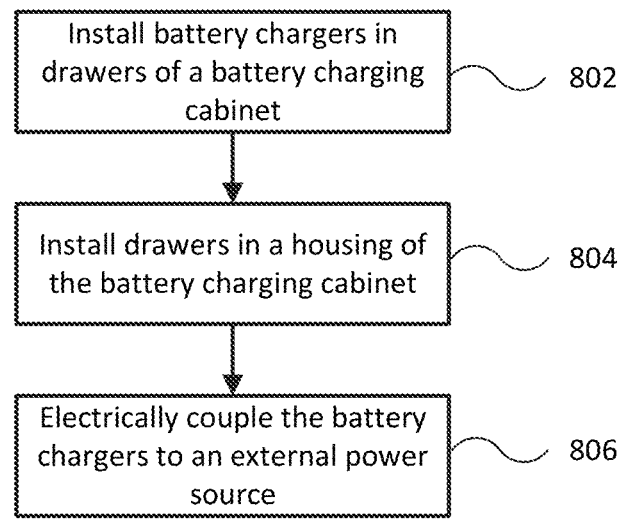
FIG. 8 illustrates a flowchart of a process for assembling a battery charging cabinet in accordance with one or more embodiments of the present disclosure.

FIG. 8 illustrates a flow diagram of a process 800 for assembling the battery charging cabinet 600 in accordance with embodiments of the present disclosure. It should be appreciated that any step, sub-step, sub-process, or block of process 800 may be performed in an order or arrangement different from the embodiments illustrated by FIG. 8. For example, one or more blocks may be omitted from or added to the process 800. Although process 800 is described with reference to the embodiments of FIGS. 6A-6H, process 800 is not limited to such embodiments.

At block 802, the battery chargers 604 are installed in the drawers 606 of the battery charging cabinet 600. For example, the battery chargers 604 may be installed in a rear end of the drawers opposite of the face 614 of the drawer 606. In various embodiments, the battery charger 604 may be installed in the drawer 606 via fasteners, adhesive, or otherwise such that the battery chargers 604 are securely held in the drawer 606. In one embodiment, a connection cable of the battery charger 604 may be inserted through an opening in the rear end of the drawer 606 such that the connection cable can electrically couple the battery charger 604 to an external power source (e.g., via port 630). In another embodiment, the battery charger 604 may have a stored charge from being charged beforehand. In such cases, the battery charger may be capable of charging the batteries 612 without the need of an external power source until the battery charger 604 runs out of charge and needs to be charged again.

At block 804, the drawers 606 are installed in the housing 602 of the battery charging cabinet 600. For example, the drawer slides 620 may be installed in the housing 602 in accordance with a mounting type of the drawer slides 620 such as a bottom mount, center mount, side mount, and/or undermount. In some instances, the drawer slides 620 may be installed to have full-extension, soft-close, ball bearing, push to open, and/or self-closing features. The drawers 606 may be mechanically coupled to the drawer slides 620 to install the drawers in the housing 602.

At block 806, the battery chargers 604 are electrically coupled to an external power source. As discussed above, the connection cable of the battery charger 604 may be inserted through an opening in the rear end of the drawer 606 such that the connection cable can electrically couple the battery charger 604 to the external power source (e.g., via port 630). A connection cable may electrically couple the port 630 to the external power source (e.g., a power generator, power outlet, wall receptacle, automotive power socket, automobile outlet, automobile battery, and similar electrical systems). As such, the external power source may distribute power to each of the battery chargers 604 such that a plurality of batteries 612 may be charged in the battery charging cabinet 600. As discussed above, in a use case where some or all of the battery chargers 604 are capable of storing a charge and operating independent from an external power source to charge the batteries 612, steps performed at block 806 may be omitted.

Where applicable, various embodiments provided by the present disclosure can be implemented using hardware, software, or combinations of hardware and software. Also, where applicable, the various hardware components and/or software components set forth herein can be combined into composite components comprising software, hardware, and/or or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A battery charging cabinet for micromobility transit vehicle batteries, the battery charging cabinet comprising:
a cabinet housing;
a first drawer configured to extend from and retract into the cabinet housing;
a plurality of charging docks disposed in the first drawer, wherein the plurality of charging docks is respectively separated by a plurality of dividers, and wherein each charging dock of the plurality of charging docks comprises a first electrical interface that is disposed on an interior bottom surface of the charging dock and configured to connect with a second electrical interface disposed on a bottom surface of a battery for a micromobility transit vehicle when the battery is placed in the charging dock; and
a plurality of battery chargers respectively installed into the plurality of charging docks disposed in the first drawer, wherein the first electrical interface of each charging dock is connected to a respective battery charger that is installed into the charging dock, wherein each battery charger comprises a stored charge, and wherein when the battery is placed in the charging dock such that the first electrical interface of the charging dock is connected to the second electrical interface disposed on the bottom surface of the battery, the stored charge of the respective battery charger associated with the charging dock is configured to charge the battery.

2. The battery charging cabinet of claim 1, wherein:
the cabinet housing has at least one opening defined in a first wall of the cabinet housing;
the battery chargers are disposed in an end of corresponding charging docks adjacent to the first wall when the first drawer is retracted in the cabinet housing; and
the at least one opening is configured to dissipate heat at least from the plurality of battery chargers.

3. The battery charging cabinet of claim 2, wherein the at least one opening comprises at least two parallel slot openings to dissipate the heat at least from the plurality of battery chargers.

4. The battery charging cabinet of claim 1, further comprising a plurality of light indicators corresponding to each of the plurality of charging docks, wherein the plurality of light indicators are disposed on a face of the first drawer and are configured to provide a visual indication of a charge status of the battery corresponding to the charging dock.

5. The battery charging cabinet of claim 1, wherein the first drawer comprises a radio-frequency integrated circuit (RFID) electromechanical lock configured to electromechanically lock or unlock the first drawer in a retracted orientation in response to receiving an RFID signal.

6. The battery charging cabinet of claim 1, further comprising mounting elements disposed on the cabinet housing and configured to interface with a receiving mounting system to secure the battery charging cabinet to the receiving mounting system.

7. The battery charging cabinet of claim 1, further comprising a port at least partially disposed in the cabinet housing and defined in a wall of the cabinet housing, wherein the port is configured to electrically couple the plurality of battery chargers to an external power source.

8. The battery charging cabinet of claim 1, further comprising:
a plurality of drawers, one of which is the first drawer, configured to extend from and retract into the cabinet housing, wherein:
each drawer of the plurality of drawers has at least one of the plurality of charging docks disposed therein; and
each drawer of the plurality of drawers has at least one of the plurality of battery chargers disposed therein.

9. A method of using the battery charging cabinet of claim 1, the method comprising:
placing the battery in the charging dock from the plurality of charging docks;
charging the battery;
removing the battery from the charging dock; and
installing the battery in the micromobility transit vehicle.

10. The battery charging cabinet of claim 1, wherein the charging docks disposed in the first drawer are of different shapes and sizes to accommodate different shaped batteries corresponding to different types of micromobility transit vehicles.

11. The battery charging cabinet of claim 1, wherein the first electrical interface of the charging dock faces upward.

12. A battery charging station comprising:
a plurality of battery charging cabinets for micromobility transit vehicle batteries, wherein each of the battery charging cabinets comprises:
a cabinet housing;
a first drawer configured to extend from and retract into the cabinet housing;
a plurality of charging docks disposed in the first drawer, wherein the plurality of charging docks is respectively separated by a plurality of dividers, and wherein each charging dock of the plurality of charging docks comprises a first electrical interface that is disposed on an interior bottom surface of the charging dock and configured to connect with a second electrical interface disposed on a bottom surface of a battery for a micromobility transit vehicle when the battery is placed in the charging dock; and
a plurality of battery chargers respectively installed into the plurality of charging docks disposed in the first drawer, wherein the first electrical interface of each charging dock is connected to a respective battery charger that is installed into the charging dock, wherein each battery charger comprises a stored charge, and wherein when the battery is placed in the charging dock such that the first electrical of the charging dock is connected to the second electrical interface disposed on the bottom surface of the battery, the stored charge of the respective battery charger associated with the charging dock is configured to charge the battery.

13. The battery charging station of claim 12, wherein:
the cabinet housing for each of the battery charging cabinets has at least one opening defined in a first wall of the cabinet housing for each of the battery charging cabinets; and
the at least one opening for each of the battery charging cabinets is configured to dissipate heat at least from the plurality of battery chargers for each of the battery charging cabinets.

14. The battery charging station of claim 13, wherein the at least one opening for each of the battery charging cabinets comprises at least two parallel slot openings to dissipate the heat at least from the plurality of battery chargers.

15. The battery charging station of claim 12, wherein:
each of the battery charging cabinets further comprises a plurality of light indicators corresponding to each of the plurality of charging docks; and
the plurality of light indicators are disposed on a face of the first drawer for each of the battery charging cabinets and are configured to provide a visual indication of a charge status of the battery corresponding to the charging dock for each of the battery charging cabinets.

16. The battery charging station of claim 12, wherein the first drawer for each of the battery charging cabinets comprises a radio-frequency integrated circuit (RFID) electromechanical lock configured to electromechanically lock and unlock the first drawer for each of the battery charging cabinets in a retracted orientation in response to receiving an RFID signal.

17. The battery charging station of claim 12, further comprising a receiving mounting system, wherein each of the battery charging cabinets further comprises mounting elements disposed on the cabinet housing and configured to interface with the receiving mounting system to secure the battery charging cabinet to the receiving mounting system in the battery charging station.

18. The battery charging station of claim 12, wherein:
each of the battery charging cabinets further comprises a port at least partially disposed in the cabinet housing and defined in a wall of the cabinet housing; and
the port is configured to electrically couple the plurality of battery chargers to an external power source.

19. The battery charging station of claim 12, wherein:
each of the battery charging cabinets comprises a plurality of drawers, one of which is the first drawer, configured to extend from and retract into the cabinet housing;
each drawer for each of the battery charging cabinets has at least one of the plurality of charging docks disposed therein; and
each drawer for each of the battery charging cabinets has at least one of the plurality of battery chargers disposed therein.

20. A method of assembling a battery charging cabinet for micromobility transit vehicle batteries, the method comprising:
installing a plurality of battery chargers respectively into a plurality of charging docks in a plurality of drawers of the battery charging cabinet, wherein:
each of the plurality of battery chargers is installed into a corresponding charging dock of the plurality of charging docks disposed in a drawer of the battery charging cabinet, wherein the plurality of charging docks is respectively separated by a plurality of dividers;

each battery charger of the plurality of battery chargers comprises a stored charge and configured to charge a battery held in the corresponding charging dock;

each charging dock of the plurality of charging docks comprises a first electrical interface that is disposed on an interior bottom surface of the charging dock and configured to connect with a second electrical interface disposed on a bottom surface of the battery for a micromobility transit vehicle when the battery is placed in the charging dock;

the first electrical interface of each charging dock is connected to a respective battery charger that is installed into the charging dock; and when the battery is placed in the charging dock such that the first electrical interface of the charging dock is connected to the second electrical interface disposed on the bottom surface of the battery, the stored charge of the respective battery charger associated with the charging dock is configured to charge the battery;

installing the plurality of drawers in a cabinet housing of the battery charging cabinet, wherein each drawer is configured to extend from and retract into the cabinet housing of the battery charging cabinet; and electrically coupling the plurality of battery chargers to an external power source.

\* \* \* \* \*